(12) United States Patent
Yoshizawa

(10) Patent No.: US 9,241,336 B2
(45) Date of Patent: Jan. 19, 2016

(54) COMMUNICATION TERMINAL DEVICE AND METHOD, BASE STATION DEVICE, AND COMMUNICATION SYSTEM

(75) Inventor: Atsushi Yoshizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 14/118,724

(22) PCT Filed: Jun. 8, 2012

(86) PCT No.: PCT/JP2012/064808
§ 371 (c)(1),
(2), (4) Date: Nov. 19, 2013

(87) PCT Pub. No.: WO2012/173062
PCT Pub. Date: Dec. 20, 2012

(65) Prior Publication Data
US 2014/0112279 A1 Apr. 24, 2014

(30) Foreign Application Priority Data
Jun. 17, 2011 (JP) .................................. 2011-135621

(51) Int. Cl.
H04W 4/00 (2009.01)
H04W 72/08 (2009.01)
H04K 3/00 (2006.01)
H04W 72/12 (2009.01)
(Continued)

(52) U.S. Cl.
CPC ............. *H04W 72/082* (2013.01); *H04K 3/226* (2013.01); *H04W 72/1215* (2013.01); *H04K 2203/16* (2013.01); *H04K 2203/18* (2013.01); *H04K 2203/36* (2013.01); *H04W 16/14* (2013.01); *H04W 88/06* (2013.01)

(58) Field of Classification Search
None
See application file for complete search history.

(56) References Cited

U.S. PATENT DOCUMENTS

2008/0233967 A1* 9/2008 Montojo et al. ............ 455/452.2
2008/0239938 A1* 10/2008 Jalloul et al. .................. 370/201
(Continued)

FOREIGN PATENT DOCUMENTS

JP 2008-211423 A 9/2008
JP 2008-271322 A 11/2008
(Continued)

OTHER PUBLICATIONS

Sudhir Kumar Baghel, et al., "Coexistence possibilities of LTE with ISM Technologies and GNSS", 2011 National Conference on Communications (NCC), Jan. 1, 2011, pp. 1-5.
(Continued)

Primary Examiner — Gregory Sefcheck
Assistant Examiner — Jael Ulysse
(74) Attorney, Agent, or Firm — Sony Corporation

(57) ABSTRACT

The present technique relates to a communication terminal device and method, a base station device, and a communication system that enable efficient communications. A first communication unit that performs a first communication with a first other device transmits information indicating the margin in which the first communication is not disturbed by a second communication with a second other device, to the first other device. The communication terminal device and the communication system of the present technique can be used to perform efficient communications between a personal computer and a communication system utilizing the personal computer, for example.

10 Claims, 19 Drawing Sheets

(51) Int. Cl.
*H04W 16/14* (2009.01)
*H04W 88/06* (2009.01)

(56) References Cited

U.S. PATENT DOCUMENTS

| | | | |
|---|---|---|---|
| 2009/0019165 A1* | 1/2009 | Li et al. | 709/227 |
| 2011/0122972 A1* | 5/2011 | Lie et al. | 375/316 |
| 2011/0312288 A1* | 12/2011 | Fu et al. | 455/88 |
| 2012/0040620 A1* | 2/2012 | Fu et al. | 455/63.1 |
| 2012/0069766 A1* | 3/2012 | Fu et al. | 370/252 |
| 2012/0082140 A1* | 4/2012 | Lin et al. | 370/336 |
| 2012/0164948 A1* | 6/2012 | Narasimha et al. | 455/63.1 |

FOREIGN PATENT DOCUMENTS

| | | |
|---|---|---|
| JP | 2010-041162 A | 2/2010 |
| WO | WO 2011/043394 A1 | 4/2011 |

OTHER PUBLICATIONS

3rd Generation Partnership Project (3GPP) "Study on Signalling and Procedure for Interference Avoidance for InDevice Coexistence", 3GPP TR 36.816, v2.0.0, May 2011, Valbonne France, pp. 1-40.
Extended European Search Report issued on Mar. 3, 2015 in patent application No. 12800575.8.

* cited by examiner

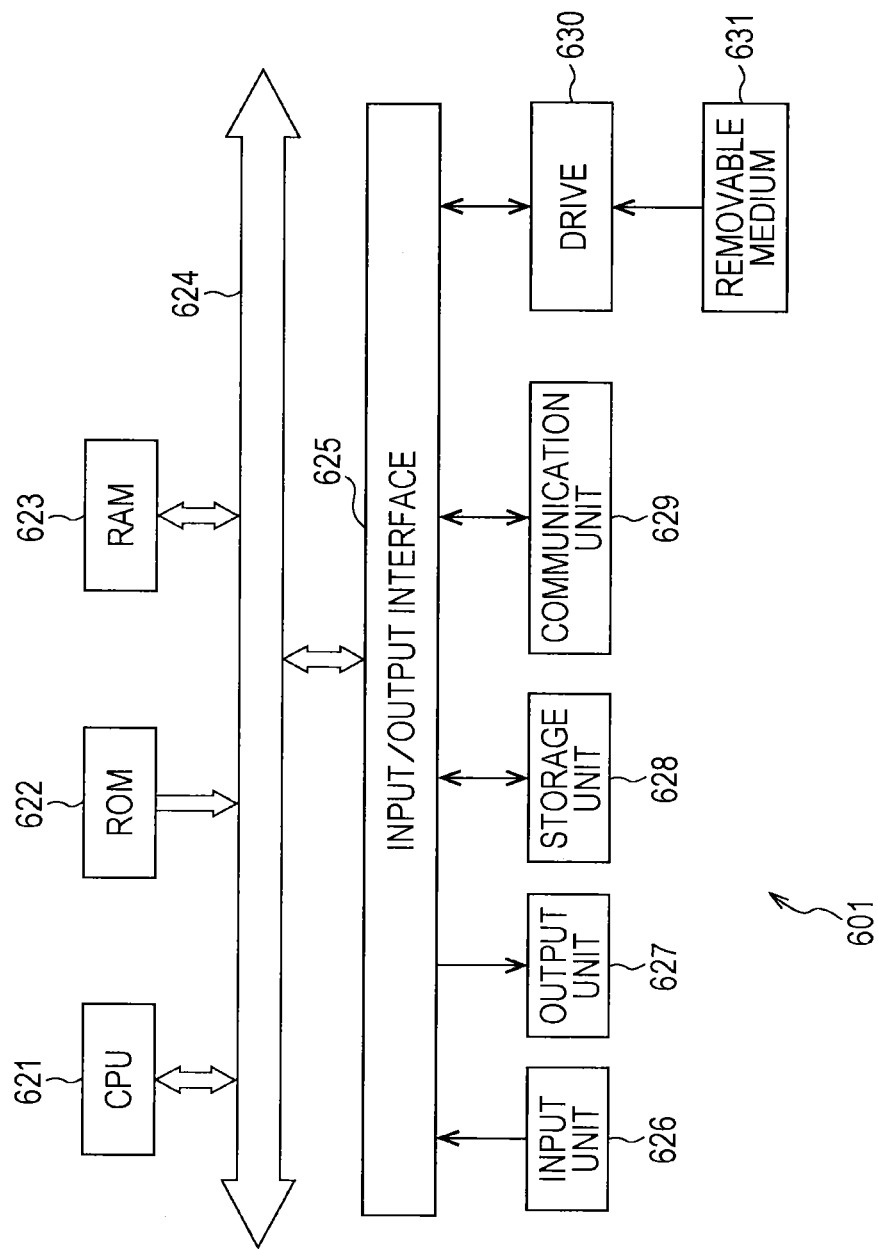

COMMUNICATION TERMINAL DEVICE AND METHOD, BASE STATION DEVICE, AND COMMUNICATION SYSTEM

TECHNICAL FIELD

The present technique relates to communication terminal devices and methods, base station devices, and communication systems, and more particularly, to a communication terminal device and method, a base station device, and a communication system that are improved to enable efficient communications.

BACKGROUND ART

At present, standardization to sophisticate LTE (Long Term Evolution) systems is progressing in 3GPP (Third Generation Partnership Project). In the standardization, a wide variety of wireless techniques related to sophistication of communications, including an increase in the maximum communication speed and higher quality at cell edges, are being considered.

One of the top priority issues with wireless communications is interference. Particularly, in a wireless cellular system, a disconnection due to interference might result in a reduction in service or greatly affect the capacity of the entire system. Therefore, the interference problem has been always a very critical technical issue in industrial applications.

As a technique related to interference in a wireless cellular system, Patent Document 1 discloses improvement to avoid interference caused by a bursty traffic.

Also, in 3GPP, the ICIC (Inter-cell Interference Coordination) technique for reducing intercell interference, the ICP (In-device Coexitence) technique for reducing interference in a terminal, and the like are being considered.

CITATION LIST

Patent Document
  Patent Document 1: JP 2008-271322 A

SUMMARY OF THE INVENTION

Problems to be Solved by the Invention

As various communication techniques have been developed, there are cases where a communication using an LTE signal and a communication using some other signal (such as a WLAN (Wireless Local Area Network) communication) are performed at the same time.

In such a situation, when an LTE signal and another signal are received at the same time, and the signal frequency of the LTE signal and the signal frequency of the other signal such as a WLAN signal become closer to each other, the LTE signal might be interfered with by the WLAN signal due to the limit of the disturbance signal removal ability of the RF filter in the user terminal device, and the user terminal device might not be able to receive an accurate LTE signal.

Also, since an LTE base station does not hold information that is about interference in user terminal devices and is conventionally received through a communication such as a WLAN communication, LTE signals cannot be kept away from interference from other systems in user terminal devices.

The present technique has been made in view of those circumstances, and is to enable efficient communications.

Solutions to Problems

A communication terminal device of one aspect of the present technique includes: a first communication unit that performs a first communication with a first other device; and a second communication unit that performs a second communication with a second other device. The first communication unit transmits information indicating the margin in which the first communication is not disturbed by the second communication, to the first other device.

The communication terminal device may further include a desense headroom calculation unit that calculates a desense headroom as the information indicating the margin. The desense headroom calculation unit can calculate the desense headroom based on a difference between a parameter that indicates a degree of disturbance of the first communication by the second communication and is stored in advance, and the parameter calculated at a predetermined time.

The desense headroom calculation unit can set a maximum signal strength that is the signal strength of a mixed signal of a signal in the first communication and a signal in the second communication when a change in the parameter becomes equal to or larger than a predetermined value as a result of an increase in the signal strength of the mixed signal, and calculate the desense headroom that is a difference between the maximum signal strength and the signal strength of the mixed signal that has been input.

When the desense headroom calculated by the desense headroom calculation unit is smaller than a threshold value, the frequency of the first communication by the first communication unit can be changed to a frequency further away from the frequency of the second communication by the second communication unit.

When the desense headroom calculated by the desense headroom calculation unit is smaller than a threshold value, the timing of the first communication by the first communication unit is changed so as not to overlap the second communication.

The parameter can be stored and associated with the frequency and the signal strength of the signal in the first communication, and the signal strength of the mixed signal of the signal in the first communication and the signal in the second communication.

The parameter can be calculated at regular time intervals, and the intervals can be made narrower when a difference between the calculated desense headroom and the threshold value becomes smaller than a predetermined value.

The parameter can be RSRQ.

A communication method of the one aspect of the present technique includes: performing a first communication with a first other device; performing a second communication with a second other device; and transmitting information indicating a margin in which the first communication is not disturbed by the second communication, to the first other device.

In the first aspect of the present technique, a first communication with a first other device is performed, a second communication with a second other device is performed, and information indicating the margin in which the first communication is not disturbed by the second communication is transmitted to the first other device.

A base station device of one aspect of the present technique includes: a communication unit that performs a first communication with a communication terminal device and receives, from the communication terminal device, information indicating the margin in which the first communication is not disturbed by a second communication with another device; and a control unit that controls the first communication to avoid interference with the first communication with the communication terminal device based on the margin-indicating information received by the communication unit.

In the second aspect of the present technique, a first communication with a communication terminal device is performed, information indicating the margin in which the first communication is not disturbed by a second communication with another device is received from the communication terminal device, and the first communication is controlled to avoid interference with the first communication with the communication terminal device based on the received information indicating the margin.

A communication system of one aspect of the present technique includes a communication terminal device and a base station device. The communication terminal device includes a first communication unit that transmits information indicating the margin in which a first communication with the base station device is not disturbed by a second communication with another device. The base station device includes: a second communication unit that performs the first communication with the communication terminal device and receives the information indicating the margin from the communication terminal device; and a control unit that controls the first communication to avoid interference with the first communication with the communication terminal device based on the margin-indicating information received by the second communication unit.

In the third aspect of the present technique, information indicating the margin in which a first communication with a base station device is not disturbed by a second communication with another device is transmitted from a communication terminal device to a base station device. The base station device performs the first communication with the communication terminal device, receives the information indicating the margin from the communication terminal device, and controls the first communication to avoid interference with the first communication with the communication terminal device based on the received information indicating the margin.

Effects of the Invention

According to an aspect of the present technique, efficient communications can be performed.

BRIEF DESCRIPTION OF DRAWINGS

FIG. 20 is a block diagram showing an example structure of the hardware of a personal computer to which the present technique is applied.

MODES FOR CARRYING OUT THE INVENTION

The following is a description of modes (hereinafter referred to as embodiments) for carrying out the present technique. Explanation will be made in the following order.
<1> First Embodiment
  1. Structure of a communication system
  2. Structure of an information terminal device
  3. Correspondence table creation process
<2> Second Embodiment
  4. Structure of a base station device
  5. DHR transmission process 1
  6. DHR transmission process 2
  7. Structure of a personal computer
  8. Others First Embodiment

[Structure of a Communication System]

Figure 1:
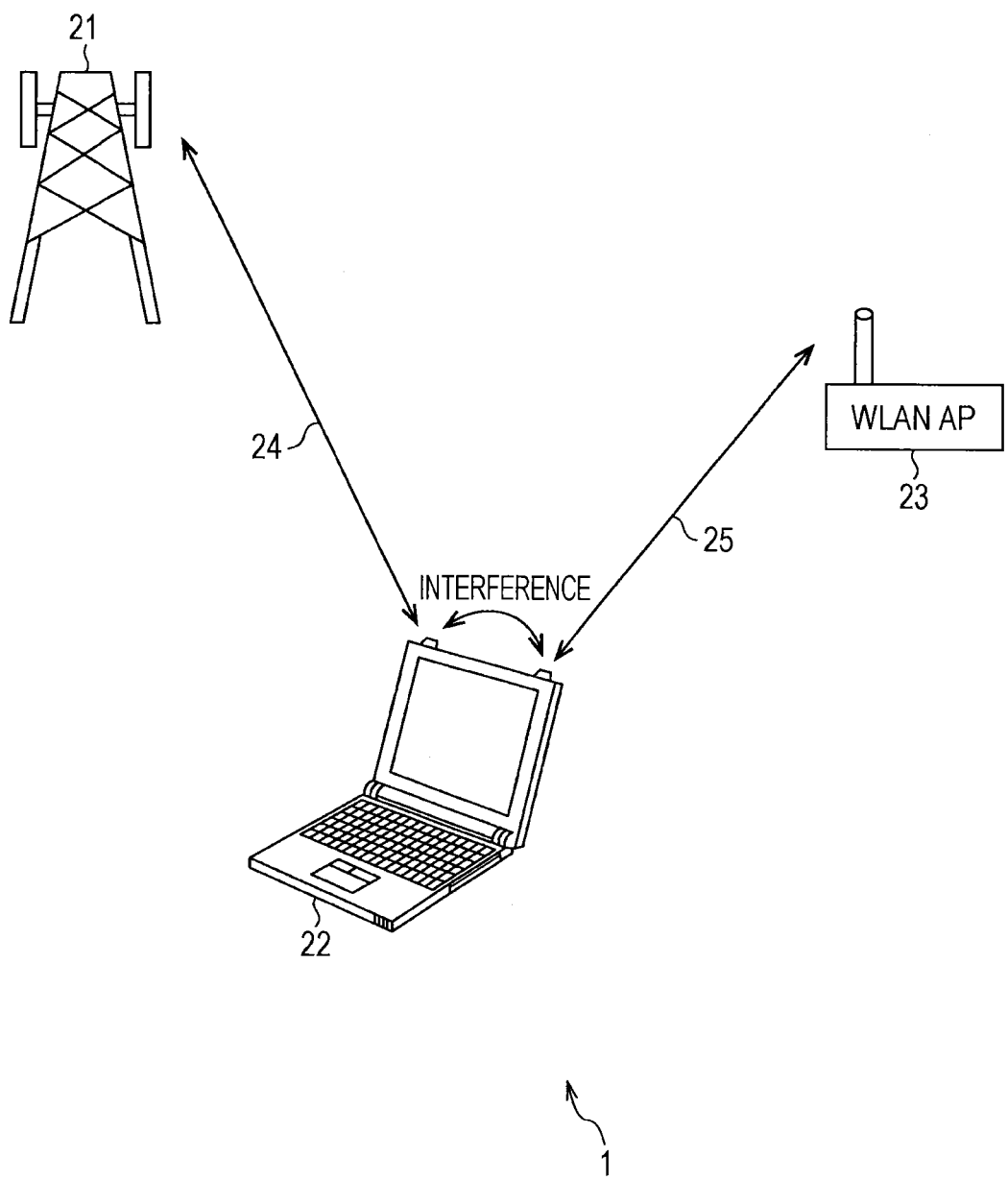
FIG. 1 is a diagram showing the structure of an embodiment of a communication system to which the present technique is applied.

FIG. 1 is a diagram showing the structure of an embodiment of a communication system to which the present technique is applied.

The communication system 1 shown in FIG. 1 includes a base station device 21, an information terminal device 22, and a WLAN access point (AP) 23.

The base station device 21 wirelessly communicates with the information terminal device 22 by using an LTE signal 24.

The information terminal device 22 as a communication terminal device can utilize a cellular wireless system using the LTE signal 24, and an ISM (Industry-Science-Medical) wireless communication technique using a WLAN signal 25.

The WLAN access point 23 wirelessly communicates with the information terminal device 22 by using the WLAN signal 25.

The information terminal device 22 can realize less expensive communications with a higher degree of freedom by combining a cellular communication system that has a relatively high communication cost per bit though having a wide communication range, and an ISM wireless communication technique that has a low communication cost per bit though having a short communication distance.

Figure 2:
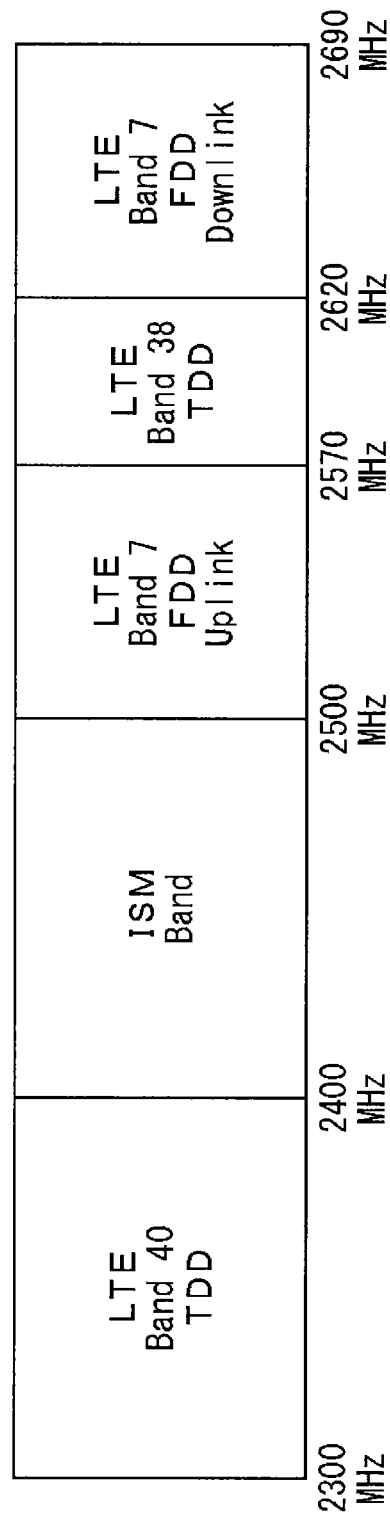
FIG. 2 is a diagram for explaining frequency bands.
Figure 3:
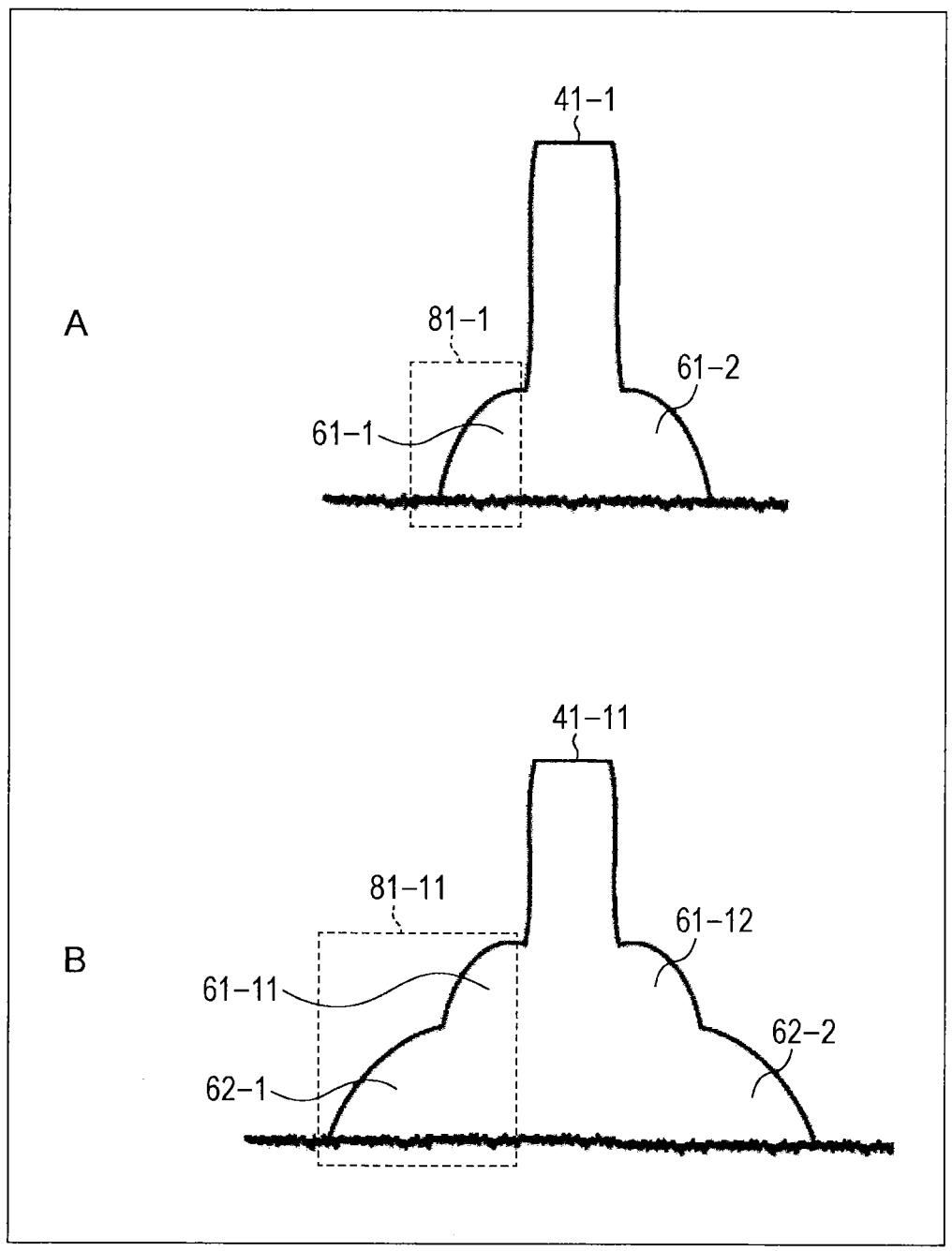
FIG. 3 is a diagram for explaining ISM signals.

However, the LTE signal 24 and an ISM signal such as the WLAN signal 25 might interfere with each other. Referring now to FIGS. 2 and 3, the LTE frequency bands and the ISM frequency band are described.

FIG. 2 is a diagram for explaining frequency bands. As shown in FIG. 2, Band 40 (2300-2400 MHz, TDD (Time Division Duplex)) of the LTE signal 24 and Band 7 (2500-2570 MHz, FDD (Frequency Division Duplex)) are adjacent to ISM Band (2400-2500 MHz).

In a case where frequency bands are adjacent to one another in such a manner, it is difficult to adequately select or separate bands.

FIG. 3 is a diagram for explaining ISM signals. In the examples shown in FIG. 3, the horizontal direction indicates frequency, and the vertical direction indicates signal strength. In a wireless communication by a WLAN communication or the like, a certain amount of distortions is allowed at the output power amplifier, so as to increase power efficiency of the power amplifier at the time of transmission consuming a large amount of power.

A of FIG. 3 shows an ISM signal 41-1 in which third-order distortions are caused. In the ISM signal 41-1, third-order distortions 61-1 and 61-2 are caused due to non-linearity of the amplifier.

B of FIG. 3 shows an ISM signal 41-11 in which third-order distortions and fifth-order distortions are caused. In the ISM signal 41-11, third-order distortions 61-11 and 61-12, and fifth-order distortions 62-1 and 62-2 are caused.

Figure 4:
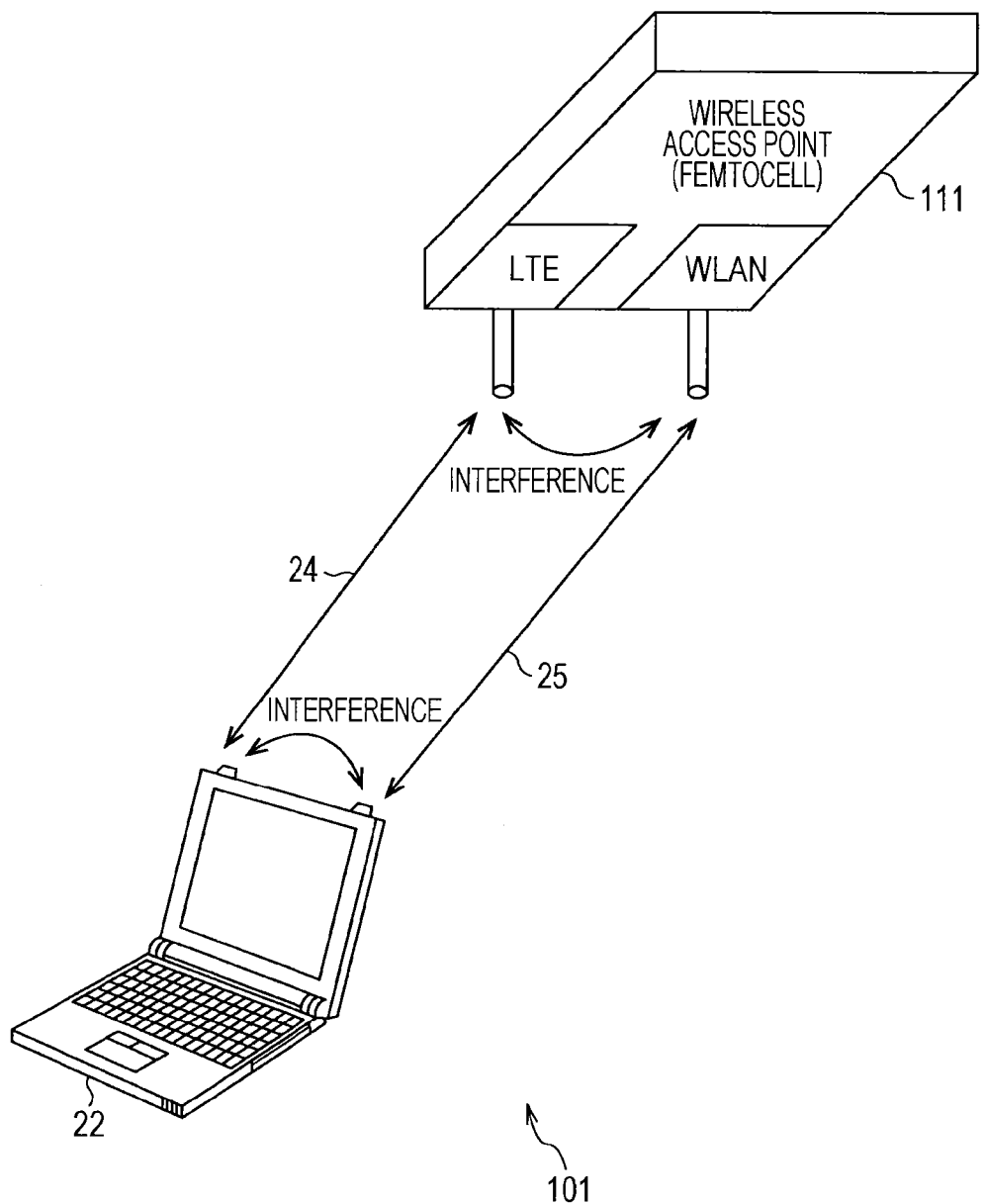
FIG. 4 is a diagram showing the structure of another embodiment of a communication system to which the present technique is applied.
Figure 5:
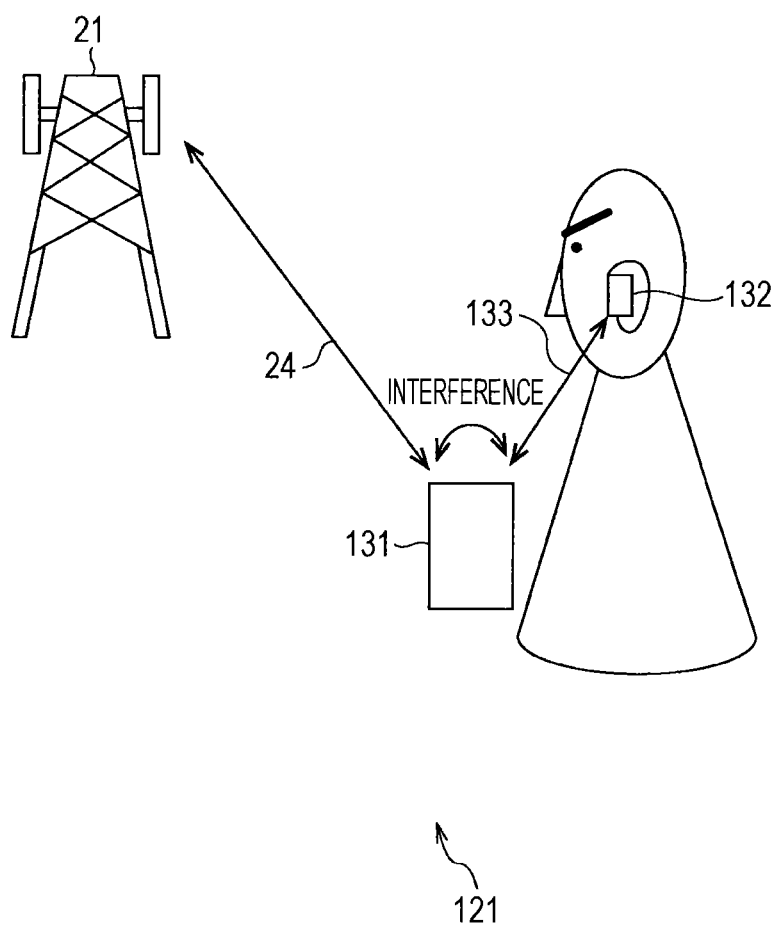
FIG. 5 is a diagram showing the structure of another embodiment of a communication system to which the present technique is applied.
Figure 6:
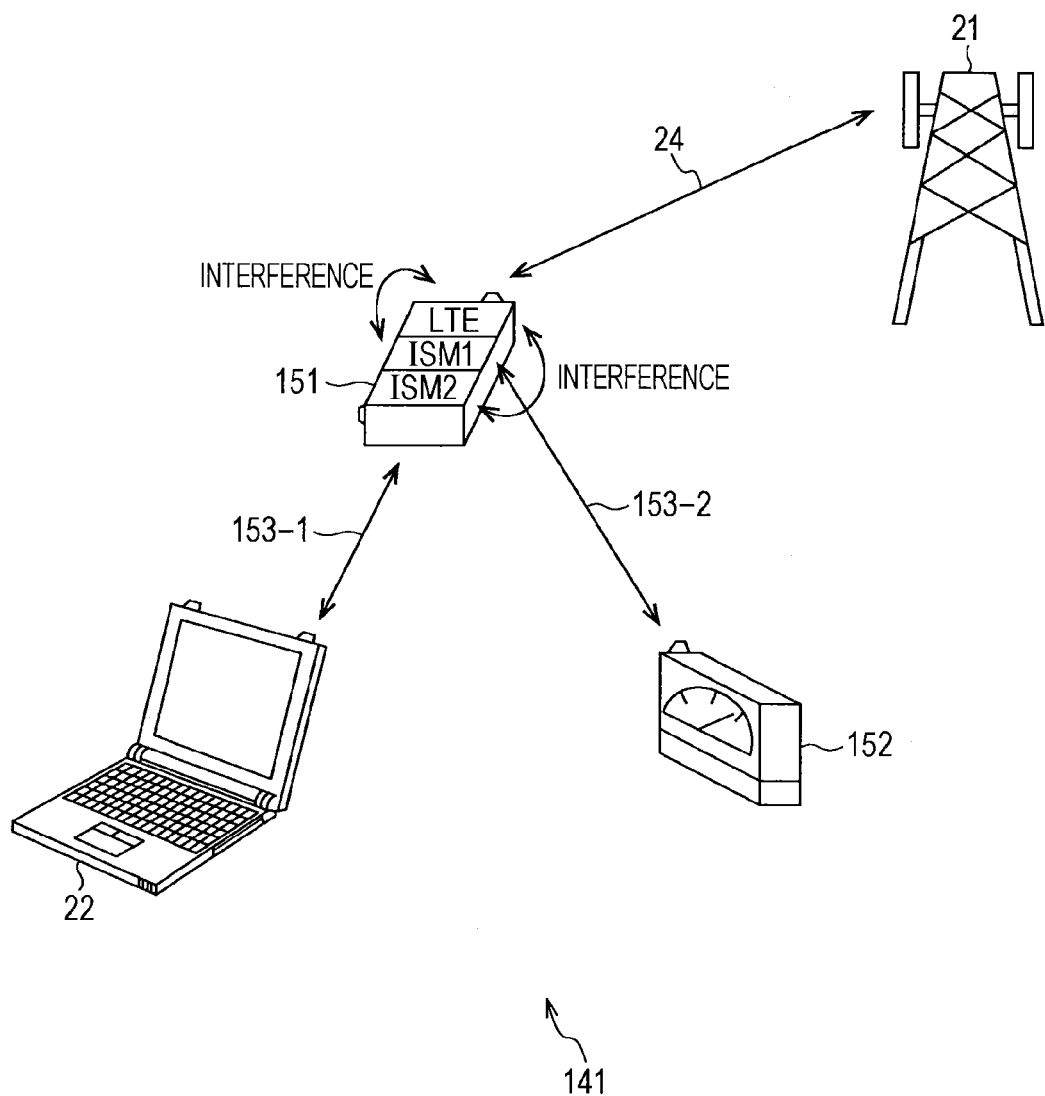
FIG. 6 is a diagram showing the structure of yet another embodiment of a communication system to which the present technique is applied.

In this case, the interference energy in interference regions 81-1 and 81-11 turn into noise that interferes with the adjacent LTE Band 40, when the ISM signal is adjacent to LTE bands and distortion components leak into the LTE bands. Referring to FIGS. 4 through 6, another example case where such interference noise occurs is described.

FIG. 4 is a diagram showing the structure of another embodiment of a communication system to which the present technique is applied.

The communication system 101 shown in FIG. 4 includes an information terminal device 22 and a wireless access point 111. In the communication system 101 shown in FIG. 4, the components equivalent to those of the communication system 1 shown in FIG. 1 are denoted by the same reference numerals as those in FIG. 1.

The wireless access point 111 also has the function of a femtocell, for example. The wireless access point 111 communicates with the information terminal device 22 by using an LTE signal 24, and also communicates with the information terminal device 22 by using a WLAN signal 25.

FIG. 5 is a diagram showing the structure of another embodiment of a communication system to which the present technique is applied.

The communication system 121 shown in FIG. 5 includes a base station device 21, a smartphone 131, and earphones 132. In the communication system 121 shown in FIG. 5, the components equivalent to those of the communication system 1 shown in FIG. 1 are denoted by the same reference numerals as those in FIG. 1.

The smartphone 131 as a communication terminal device can utilize a cellular wireless system involving an LTE signal 24 or the like, and an ISM wireless communication technique involving a Bluetooth (a registered trademark) signal 133 or the like.

The earphones 132 have a Bluetooth (a registered trademark) communication function, and communicate with the smartphone 131 by using the Bluetooth (a registered trademark) signal 133.

FIG. 6 is a diagram showing the structure of yet another embodiment of a communication system to which the present technique is applied.

The communication system 141 shown in FIG. 6 includes a base station device 21, an information terminal device 22, a wireless gateway 151, and an ISM communication device 152. In the communication system 141 shown in FIG. 6, the components equivalent to those of the communication system 1 shown in FIG. 1 are denoted by the same reference numerals as those in FIG. 1.

The wireless gateway 151 communicates with the base station device 21 by using an LTE signal 24, communicates with the information terminal device 22 by using an ISM signal 153-1, and communicates with the ISM communication device 152 by using an ISM signal 153-2.

It should be noted that the system configurations described above are merely examples, and do not in any way limit possibilities of other embodiments.

[Structure of an Information Terminal Device]

Figure 7:
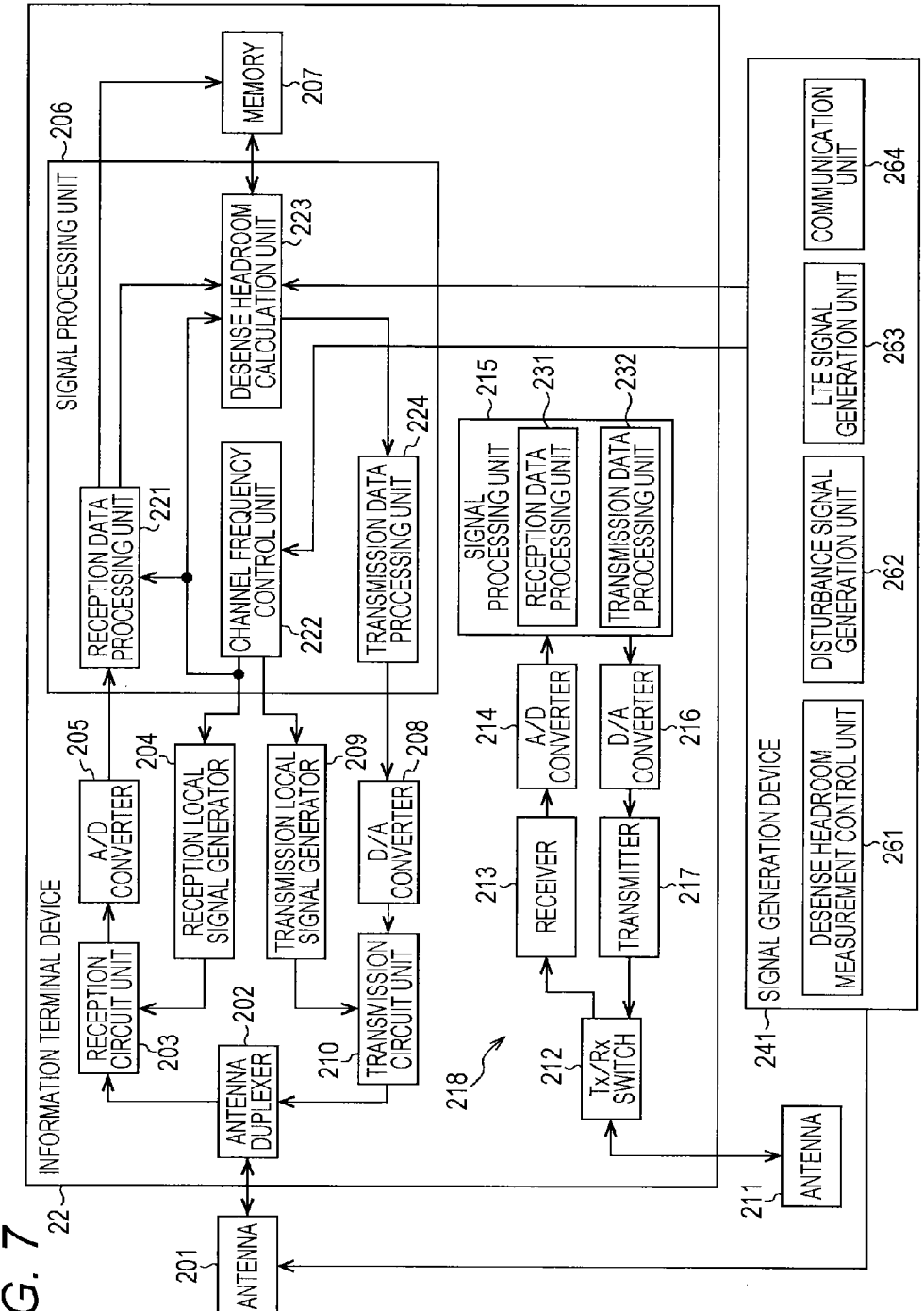
FIG. 7 is a diagram showing the structures of an information terminal device and a signal generation device.

FIG. 7 is a diagram showing the structures of an information terminal device 22 and a signal generation device 241.

The information terminal device 22 includes an antenna 201, an antenna duplexer 202, a reception circuit unit 203, a reception local signal generator 204, an A/D converter 205, a signal processing unit 206, a memory 207, a D/A converter 208, a transmission local signal generator 209, and a transmission circuit unit 210.

The information terminal device 22 also includes an ISM communication unit 218 that is formed with an antenna 211 a Tx (Transmitter)/Rx (Receiver) switch 212, a receiver 213, an A/D converter 214, a signal processing unit 215, a D/A converter 216, and a transmitter 217.

The antenna 201 transmits and receives signals to and from the other end through radio waves. The antenna duplexer 202 outputs signals received via the antenna 201 to the reception circuit unit 203, and supplies signals output from the transmission circuit unit 210 to the antenna 201.

Figure 8:
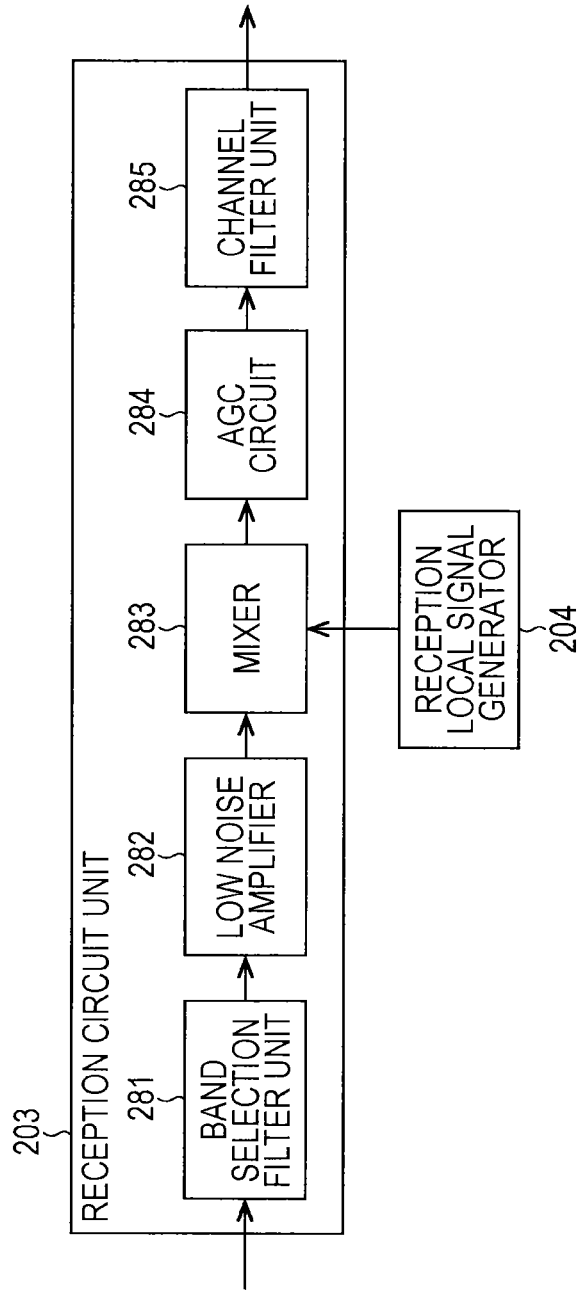
FIG. 8 is a diagram showing the structure of a reception circuit unit.

The reception circuit unit 203 extracts the signal of a predetermined channel from the received signals. Referring now to FIG. 8, the reception circuit unit 203 is described in detail.

FIG. 8 is a diagram for explaining the reception circuit unit 203 in detail. The reception circuit unit 203 includes a band selection filter unit 281, a low noise amplifier 282, a mixer 283, an AGC (Automatic Gain Control) circuit 284, and a channel filter unit 285.

The band selection filter unit 281 extracts a specific frequency component by using a predetermined band selection RF filter, and supplies the frequency component to the low noise amplifier 282.

The low noise amplifier 282 amplifies the RF signal supplied from the band selection filter unit 281, and supplies the RF signal to the mixer 283.

To extract a signal at a predetermined frequency from the RF signal supplied to the mixer 283 from the low noise amplifier 282, the reception local signal generator 204 generates a signal at a frequency corresponding to the signal to be extracted, and supplies the generated signal to the mixer 283.

The mixer 283 mixes the signal supplied from the low noise amplifier 282 with the signal supplied from the reception local signal generator 204, to extract the frequency component of a baseband signal from the RF signal supplied from the low noise amplifier 282 and supplies the frequency component to the AGC circuit 284.

The AGC circuit 284 adjusts the signal supplied from the mixer 283 to an appropriate signal strength, and supplies the adjusted signal to the channel filter unit 285. The channel filter unit 285 removes unnecessary, out-of-channel signal components by using a channel filter.

Referring back to FIG. 7, the A/D converter 205 converts the analog signal supplied from the reception circuit unit 203 to a digital signal, and supplies the digital signal to the signal processing unit 206.

The signal processing unit 206 performs predetermined signal processing. The signal processing unit 206 is formed with a reception data processing unit 221, a channel frequency control unit 222, a desense headroom calculation unit 223, and a transmission data processing unit 224.

Based on the digital signal supplied from the A/D converter 205, the reception data processing unit 221 calculates RSRQ (Reference Signal Received Quality), and supplies the RSRQ to the desense headroom calculation unit 223.

The RSRQ is a parameter that is used in an LTE system and is indicative of quality related to signal-to-noise ratio. The RSRQ is expressed by the following equation (1).

$$RSRQ = N \cdot RSRP/RSSI \qquad (1)$$

Here, the RSRP (Reference Signal Received Power) is the LTE signal strength per LTE resource block. The RSSI (Received Signal Strength Indicator) is the value of all the energy including noise when observed in the channel band. N represents the number of resource blocks used in the LTE measurement.

RSRQ is specifically defined in Non-Patent Document 1: LTE Specification, 3GPP TS36.214 Physical Layer Measurements. It should be noted that any newly-defined concept equivalent to RSRQ may be used.

The memory 207 stores correspondence tables supplied from the reception data processing unit 221. In the correspondence tables, RSRQs are associated with information about frequencies and signal strengths of received signals.

In accordance with an instruction from the signal generation device 241, the channel frequency control unit 222 controls the reception local signal generator 204 and the transmission local signal generator 209 to generate signals at predetermined frequencies.

The channel frequency control unit 222 also supplies a signal corresponding to the frequency to be generated by the reception local signal generator 204, to the reception data processing unit 221 and the desense headroom calculation unit 223. This signal can be supplied directly from the signal generation device 241.

The desense headroom calculation unit 223 calculates a desense headroom from the RSRQ calculated by the reception data processing unit 221 at the time of a communication with a base station device 21 and from a correspondence table stored beforehand in the memory 207, creates a desense headroom report (DHR) for notifying the base station device 21 of the desense headroom, and supplies the DHR to the transmission data processing unit 224.

The DHR is the information indicating the margin related to the disturbance level at which an LTE signal is disturbed by an ISM signal or the like, resulting in communication incompetence.

The transmission data processing unit 224 performs all digital signal processing including a process for transmitting the DHR, such as data encoding.

The D/A converter 208 converts the digital data supplied from the transmission data processing unit 224 to an analog signal. The transmission circuit unit 210 modulates the analog signal by using a signal at a predetermined frequency supplied from the transmission local signal generator 209, and supplies the modulated signal to the antenna duplexer 202.

The receiver 213 of the ISM communication unit 218 receives a WLAN signal 25 from a wireless communication device such as a WLAN access point 23, a wireless access point 111, earphones 132, or an ISM communication device 152, via the antenna 211 and the Tx/Rx switch 212. The receiver 213 also receives wireless signals such as a Bluetooth (a registered trademark) signal 133 and an ISM signal 153.

The A/D converter 214 converts the analog signal supplied from the receiver 213 to a digital signal, and supplies the digital signal to the reception data processing unit 231 of the signal processing unit 215. The reception data processing unit 231 performs various kinds of processing on the supplied digital signal.

The transmission data processing unit 232 of the signal processing unit 215 performs all digital signal processing such as data encoding.

The D/A converter 216 converts the digital data supplied from the transmission data processing unit 232 to an analog signal. The transmitter 217 outputs the analog signal supplied from the D/A converter 216 to a wireless communication device via the Tx/Rx switch 212 and the antenna 211.

The signal generation device 241 includes a desense headroom measurement control unit 261, a disturbance signal generation unit 262, an LTE signal generation unit 263, and a communication unit 264.

To cause the information terminal device 22 to calculate a DHR, the desense headroom measurement control unit 261 sets frequencies and signal strengths for LTE signals and disturbance signals.

The disturbance signal generation unit 262 generates a disturbance signal. The disturbance signal is a signal that interferes with an ISM signal and an LTE signal. The LTE signal generation unit 263 generates an LTE signal.

The communication unit 264 generates a signal that transmits the LTE signal generated by the LTE signal generation unit 263 and the disturbance signal generated by the disturbance signal generation unit 262, to the information terminal device 22.

The generated LTE signal and disturbance signal are transmitted to the information terminal device 22 via the antenna 201. Alternatively, the generated LTE signal and disturbance signal can be supplied directly to the antenna duplexer 202.

[Correspondence Table Creation Process]

Referring now to FIGS. 9 through 13, a correspondence table creation process is described. This correspondence table creation process is performed when the information processing terminal 22 is manufactured.

Alternatively, a device that has the same function as the signal generation device 241 may be incorporated into the information terminal device 22, and the correspondence table creation process may be performed when any communication is not being performed, while a user uses the information terminal device 22 in the LTE system.

Figure 9:
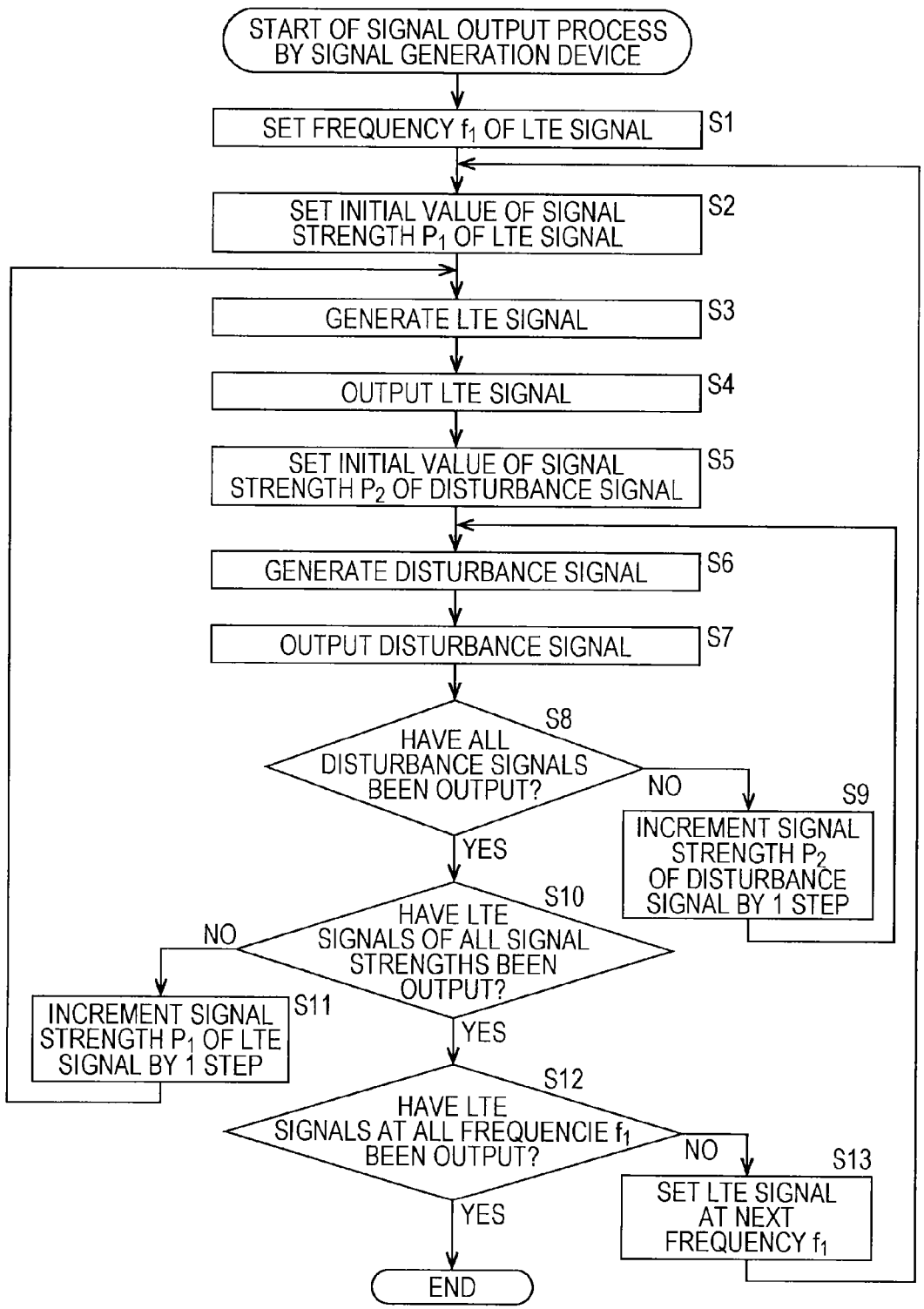
FIG. 9 is a flowchart for explaining a signal output process by the signal generation device.
Figure 10:
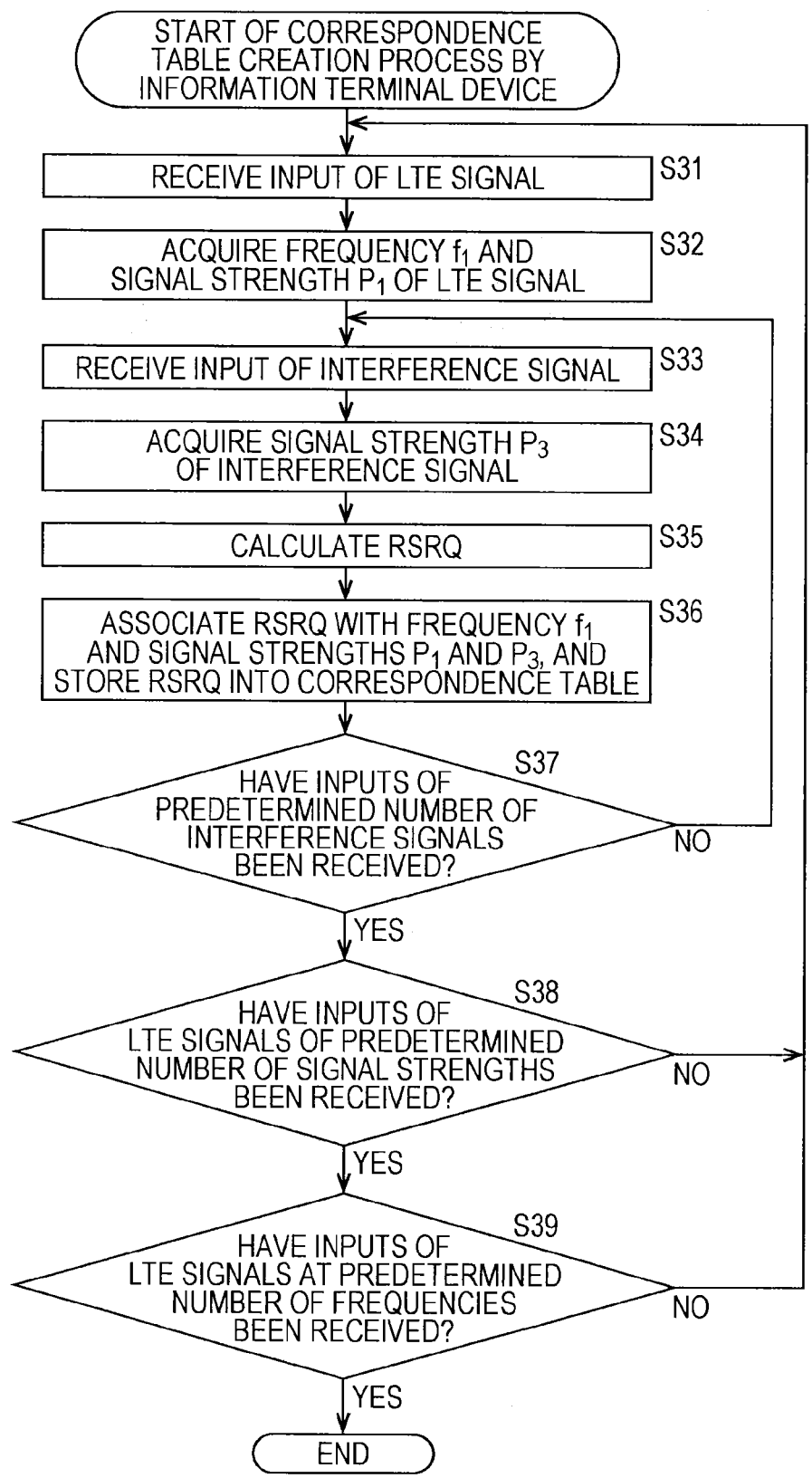
FIG. 10 is a flowchart for explaining a correspondence table creation process by the information terminal device.

FIG. 9 is a flowchart for explaining a signal output process by the signal generation device 241. FIG. 10 is a flowchart for explaining the correspondence table creation process by the information terminal device 22.

The signal output process by the signal generation device 241 shown in FIG. 9 is started in accordance with an instruction from the manufacturer or the like.

In step S1, the desense headroom measurement control unit 261 of the signal generation device 241 sets the frequency $f_1$ of an LTE signal at $f_{1\_1}$. In step S2, the desense headroom measurement control unit 261 sets an initial value $P_{1\_1}$ as the signal strength $P_1$ of an LTE signal.

In step S3, the LTE signal generation unit 263 generates an LTE signal. That is, an LTE signal having the frequency $f_{1\_1}$ and the signal strength $P_{1\_1}$ set by the desense headroom measurement control unit 261 in steps S1 and S2 is generated.

In step S4, the communication unit 264 outputs the LTE signal having the frequency $f_{1\_1}$ and the signal strength $P_{1\_1}$. That is, the LTE signal having the frequency $f_{1\_1}$ and the signal strength $P_{1\_1}$ is output to the information terminal device 22.

In step S31 in FIG. 10, the reception circuit unit 203 of the information terminal device 22 receives an input of the LTE signal via the antenna 201 and the antenna duplexer 202. Specifically, the LTE signal having the frequency $f_{1\_1}$ and the signal strength $P_{1\_1}$, which is output through the processing in step S3 in FIG. 9, is input.

In the reception circuit unit 203, the frequency component of the LTE signal is extracted by the band selection filter unit 281, and is amplified by the low noise amplifier 282.

At this point, the desense headroom measurement control unit 261 controls the channel frequency control unit 222, to cause the reception local signal generator 204 to generate a signal at a frequency necessary for demodulating the LTE signal.

The mixer 283 multiplies the signal output from the low noise amplifier 282 by the signal generated by the reception local signal generator 204, to extract the baseband component of the LTE signal.

The AGC circuit 284 adjusts the level of the extracted signal, and outputs the resultant signal to the channel filter unit 285. The channel filter unit 285 removes the components of unnecessary frequency bands from the input signal, and outputs the resultant signal to the reception data processing unit 221 via the A/D converter 205.

In step S32, the reception data processing unit 221 acquires the frequency $f_1$ and the signal strength $P_1$ of the LTE signal.

For example, the value of the frequency $f_1$ that is set by the desense headroom measurement control unit 261 is supplied to the reception data processing unit 221 via the channel frequency control unit 222.

The signal strength $P_1$ is supplied, together with the frequency $f_1$, from the desense headroom measurement control unit 261.

Alternatively, in a case where an LTE signal generated from the signal generation device 241 and is acquired via the antenna 201, the antenna duplexer 202, the reception circuit unit 203, and the A/D converter 205, for example, the LTE signal may be supplied to the reception data processing unit 221, and the reception level therein may be set at the signal strength $P_1$. In this case, the signal component of a disturbance signal is of course cut off.

In step S5 in FIG. 9, the desense headroom measurement control unit 261 of the signal generation device 241 sets an initial value $P_{2\_1}$ as the signal strength $P_2$ of a disturbance signal.

The value of the frequency $f_2$ of a disturbance signal is fixed to the frequency closest to the LTE signal, for example. That is, the frequency of a disturbance signal that is the most severe for the LTE signal is set as the frequency $f_2$.

In step S6, the disturbance signal generation unit 262 generates a disturbance signal. Specifically, a disturbance signal having the signal strength $P_{2\_1}$ which is set by the desense headroom measurement control unit 261 in step S5, is generated.

In step S7, the communication unit 264 outputs the disturbance signal. That is, the disturbance signal having the signal strength $P_{2\_1}$ is output to the information terminal device 22.

In step S33, the reception circuit unit 203 of the information terminal device 22 receives an input of an interference signal via the antenna 201 and the antenna duplexer 202.

Specifically, an interference signal as a mixed signal of the LTE signal, which is output through the processing in step S4 in FIG. 9 and has the frequency $f_{1\_1}$ and the signal strength $P_{1\_1}$, and the disturbance signal, which is output through the processing in step S7 and has the signal strength $P_{2\_1}$, is input.

In step S34, the reception data processing unit 221 acquires the signal strength $P_3$ of the interference signal. In this case, the signal strength $P_3$ is the level of a signal that is output from the A/D converter 205, and the value thereof is acquired.

Specifically, the signal strength $P_3$ of the mixed signal of the LTE signal transmitted through the processing in step S4 in FIG. 9 and the disturbance signal transmitted through the processing in step S7 is acquired as the level $P_{3\_1}$ of the input interference signal.

In step S35, the reception data processing unit 221 calculates RSRQ.

The RSRP indicates the signal strength (the mean value of reference signals) supplied from the base station device 21, for example. Reference signals are normally transmitted from the base station device 21 at very short intervals. The RSSI indicates the value of all the energy observed in the channel band.

In this process of creating correspondence tables, however, the signal strength $P_3$ of the interference signal acquired in step S34 is used as the RSSI, which is the denominator in the equation (1).

The numerator RSRP is calculated by using the signal strength $P_1$ of the LTE signal acquired from the desense headroom measurement control unit 261 in step S32, and the gain of the reception system formed with the antenna 201, the antenna duplexer 202, the reception circuit unit 203, and the A/D converter 205.

Measurement can be carried out with higher accuracy by performing adjustment such as an addition of an offset value to a measured value, if necessary, so that the calculated RSRQ becomes closer to the RSRQ determined exclusively from RSRPs and RSSIs obtained in actual operations.

Accordingly, a signal at a known input level is input to the reception system of the information terminal device 22, and gain variations can be corrected.

As for the numerator RSRP, in a case where the signal strength $P_1$ is acquired via the antenna 201, the antenna duplexer 202, the reception circuit unit 203, and the A/D converter 205 through the processing in step S32 in FIG. 10, for example, more accurate measurement can be carried out by performing measured value adjustment such as an addition of an appropriate offset value to the acquired signal strength $P_1$.

As described above, the RSRP can be accurately calculated by performing appropriate correction on the signal strength $P_1$, and the signal strength $P_1$ is not necessarily acquired from the signal generation device 241 via the channel frequency control unit 222, or is not necessarily acquired via the antenna 201, the antenna duplexer 202, the reception circuit unit 203, and the A/D converter 205 as described above.

In this embodiment, the RSRQ is used as the parameter that indicates the degree of LTE communication disturbance by a WLAN communication, but it is possible to use some other parameter.

According to Non-Patent Document 1, N represents the number of LTE signal resource blocks used in RSRQ measurement. In the correspondence table creation process, N is measured as 1 for ease of processing, and errors caused due to the value of N during actual RSRQ measurement can be easily removed in the process of adding the above mentioned offset value.

Figure 11:
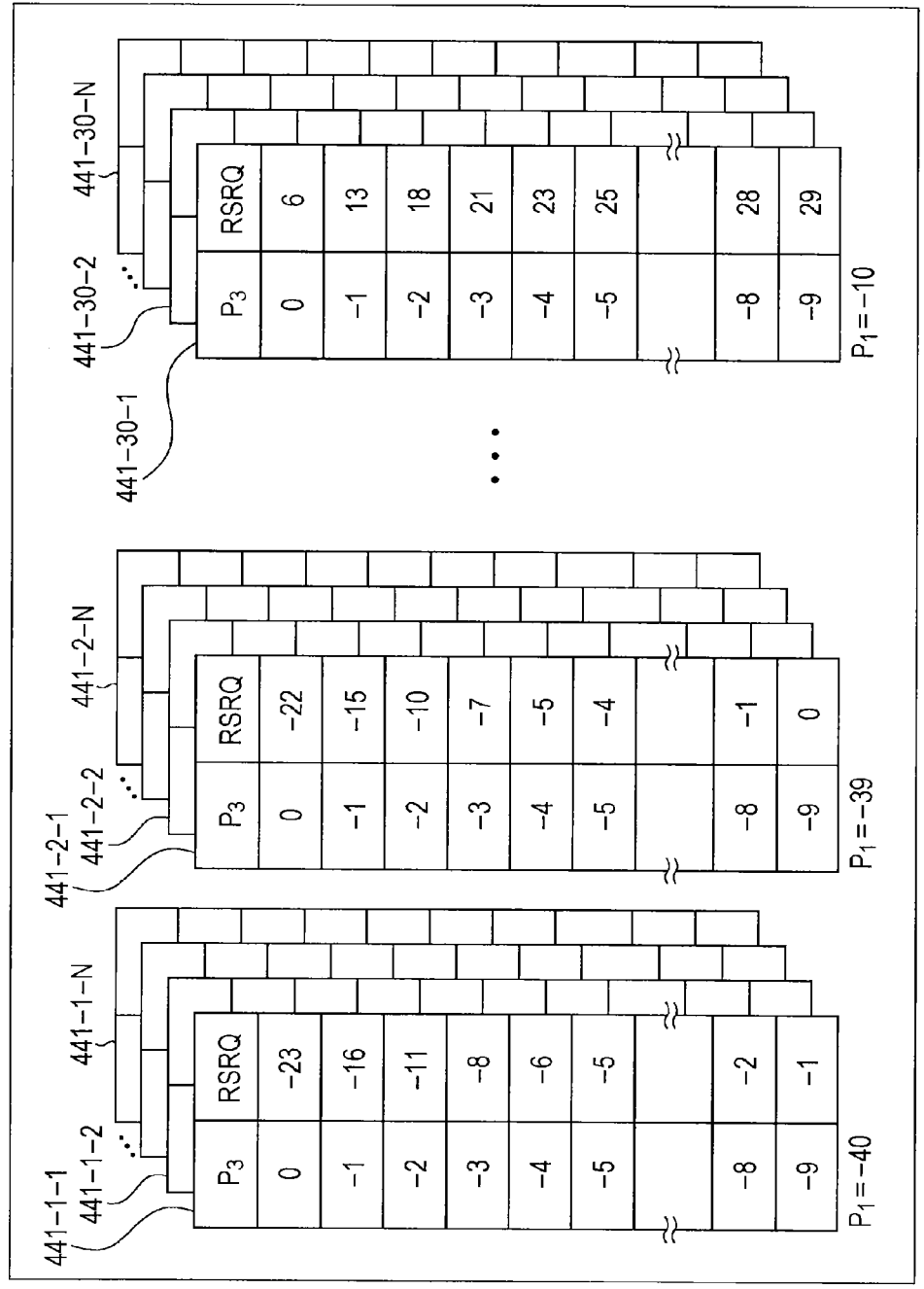
FIG. 11 is a diagram showing examples of correspondence tables.

In step S36, the reception data processing unit 221 stores the RSRQ associated with the frequency $f_{1\_1}$ and the signal strengths $P_{1\_1}$ and $P_{3\_1}$ into a correspondence table. Referring now to FIG. 11, the correspondence tables stored in the memory 207 are described.

FIG. 11 is a diagram showing examples of correspondence tables. In a case where the signal strength $P_1$ corresponding to the frequency $f_{1\_1}$ of the LTE signal is −40 dB, the signal strength $P_3$ of the interference signal is −9 dB, and the RSRQ calculated through the processing in step S36 is −1, for example, −1 is stored as the RSRQ into the lowest field corresponding to −9 dB in the column of the signal strength $P_3$ of the interference signal in a correspondence table 441-1-1 of a case where the frequency is $f_{1\_1}$ and the signal strength $P_1$ is −40 dB.

Referring back to FIG. 10, in step S37, the reception data processing unit 221 determines whether a predetermined number of interference signal inputs have been received. If it is determined in step S37 that the predetermined number of interference signal inputs has not been received yet, the process returns to step S33.

In step S8 in FIG. 9, the desense headroom measurement control unit 261 of the signal generation device 241 determines whether all disturbance signals have been output.

If it is determined in step S8 that not all the disturbance signals have been output, the process advances to step S9.

In step S9, the desense headroom measurement control unit 261 increments the signal strength $P_2$ of the disturbance signal only by 1 step (such as 1 dB), to set a signal strength $P_{2\_2}$. It should be noted that the increment amount for the signal strength $P_2$ of the disturbance signal is not limited to 1 dB.

After the processing in step S9, the process returns to step S6, and the processing thereafter is repeated. For example, the disturbance signal having the signal strength $P_2$ incremented only by 1 dB is transmitted to the information terminal device 22.

The processing in steps S33 through S37 in FIG. 10 is then repeated, and the RSRQ based on the input interference signal is stored into the correspondence table.

Through the above processing, −2, . . . , −5, −6, −8, −11, −16, and −23 are sequentially stored as the corresponding RSRQs into the respective fields corresponding to −8 dB, . . . , −5 dB, −4 dB, −3 dB, −2 dB, −1 dB, and 0 dB in the column of the signal strength $P_3$ of interference signals in the correspondence table 441-1-1 of the case where the frequency is $f_{1\_1}$ and the signal strength $P_1$ is −40 dB.

If it is determined in step S8 in FIG. 9 that all the disturbance signals have been output, the desense headroom measurement control unit 261 in step S10 determines whether LTE signals of all signal strengths have been output.

If it is determined in step S10 that LTE signals of all signal strengths have not been output yet, the process advances to step S11.

In step S11, the desense headroom measurement control unit 261 increments the signal strength $P_1$ of the LTE signal only by 1 step (such as 1 dB), to set a signal strength $P_{1\_2}$. It should be noted that the increment amount for the signal strength $P_1$ of the LTE signal is not limited to 1 dB.

After the processing in step S11, the process returns to step S3, and the processing thereafter is repeated.

During this repeated processing, if it is determined in step S37 in FIG. 10 that the predetermined number of interference signal inputs have been received, the reception data processing unit 221 of the information terminal device 22 in step S38 determines whether inputs of LTE signals of a predetermined number of signal strengths have been received.

If it is determined in step S38 that inputs of LTE signals of the predetermined number of signal strengths have not been received yet, the process returns to step S31, and the processing thereafter is performed.

For example, an LTE signal having the signal strength $P_1$ incremented only by 1 dB is output to the information terminal device 22, and the RSRQ of each signal strength $P_3$ of the interference signals is stored into the correspondence table based on the output LTE signal.

This processing is repeated, to create correspondence tables 441-2-1 through 441-30-1 of cases where the frequency $f_1$ is $f_{1\_1}$ and the signal strength $P_1$ is from −39 dB to −10 dB.

Referring back to FIG. 9, if it is determined in step S10 that LTE signals of all the signal strengths have been output, the desense headroom measurement control unit 261 of the signal generation device 241 in step S12 determines whether LTE signals of all frequencies have been output.

If it is determined in step S12 that LTE signal of all the frequencies have not been output yet, the desense headroom measurement control unit 261 in step S13 sets an LTE signal having the next frequency $f_{1\_2}$ as the frequency $f_1$.

After the processing in step S13, the process returns to step S2, and the processing thereafter is repeated.

During this repeated processing, if it is determined in step S38 in FIG. 10 that inputs of LTE signals of the predetermined number of signal strengths have been received, the reception data processing unit 221 of the information terminal device 22 in step S39 determines whether inputs of LTE signals of a predetermined number of frequencies have been received.

If it is determined in step S39 that inputs of LTE signals of the predetermined frequencies have not been received yet, the process returns to step S31, and the processing thereafter is performed.

This processing is repeated, to create correspondence tables 441-2-2 through 441-30-2 of cases where the frequency is $f_{1\_2}$ and the signal strength $P_1$ is from −39 dB to −10 dB.

Correspondence tables 441-1-3, . . . , 441-30-3 through 441-1-N, . . . , 441-30-N of cases where the frequency is from $f_{1\_3}$ to $f_1 N$ are created in the same manner as above.

As described above, correspondence tables showing RSRQs indicating degrees of disturbance of LTE signals by disturbance signals are stored in each information terminal device 22. Accordingly, the base station device 21 can be more accurately notified of the reception status of each information terminal device 22.

Although RSRQ correspondence tables are created by using LTE signals and disturbance signals (WLAN signals, for example) in this embodiment, the LTE signals and the disturbance signals can be substituted by sine waves.

Second Embodiment

Figure 12:
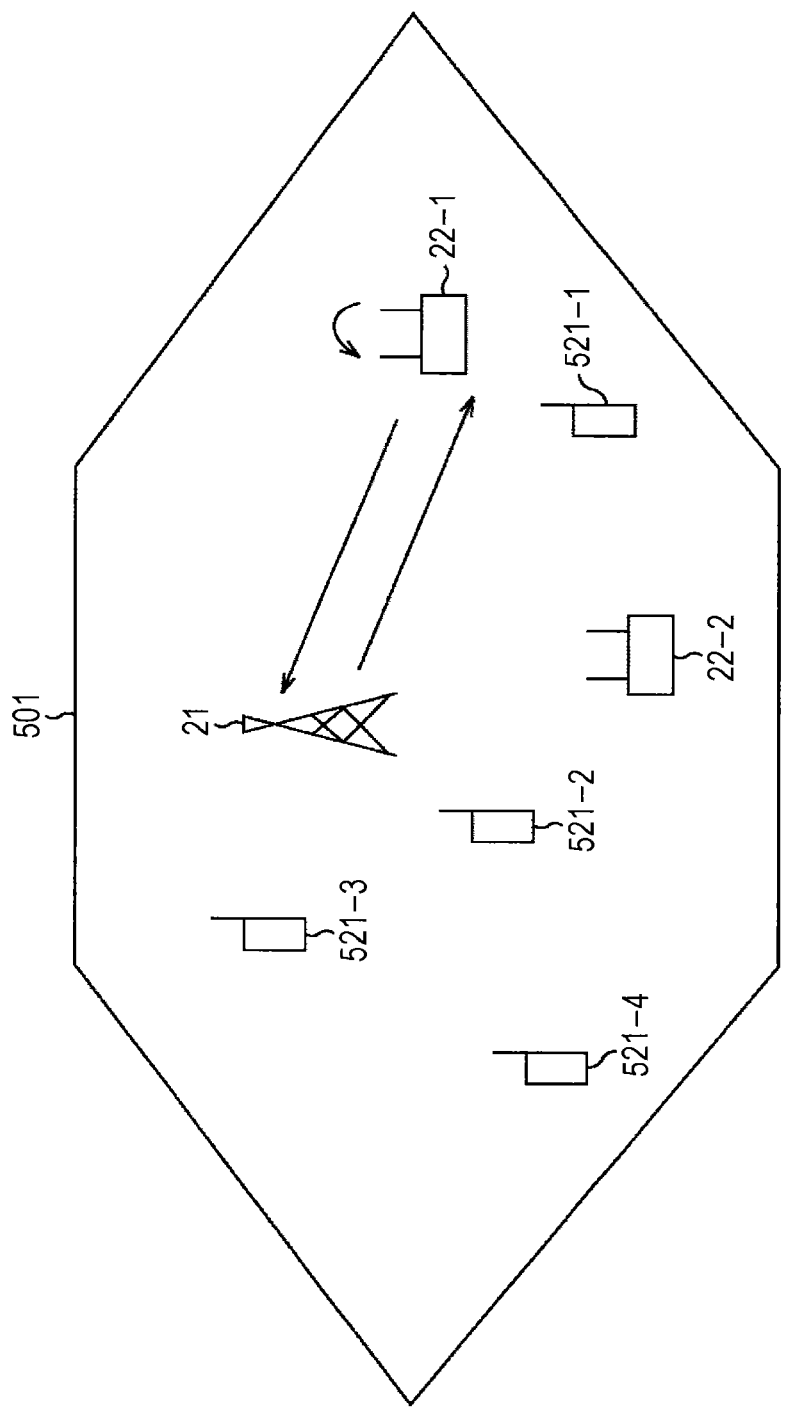
FIG. 12 is a diagram for explaining the outline of a communication by a base station device.

FIG. 12 is a diagram for explaining the outline of a communication performed by a base station device 21.

As shown in FIG. 12, information terminal devices 22-1 and 22-2 and LTE signal reception devices 521-1 through 521-4 exist in the communication range 501 of the base station device 21. The number of information terminal devices 22 and the number of LTE signal reception devices 521 are of course not limited to the above.

The LTE signal reception devices 521-1 through 521-4 receive only LTE signals, and do not receive ISM signals and others. Therefore, interference does not occur.

[Structure of a Base Station Device]

Figure 13:
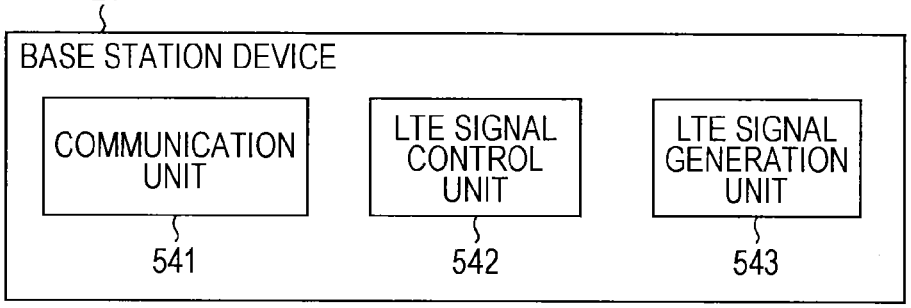
FIG. 13 is a block diagram showing the structure of the base station device.

FIG. 13 is a block diagram showing the functional structure of a base station device 21. The base station device 21 is formed with a communication unit 541, an LTE signal control unit 542, and an LTE signal generation unit 543.

The communication unit 541 communicates with the information terminal devices 22-1 and 22-2, and the LTE signal reception device 521- through 521-4.

The LTE signal control unit 542 sets frequencies, signal strengths, and the like for LTE signals. The LTE signal generation unit 543 generates LTE signals based on the frequencies, the signal strengths, and the like set by the LTE signal control unit 542.

[DHR Transmission Process 1]

Figure 14:
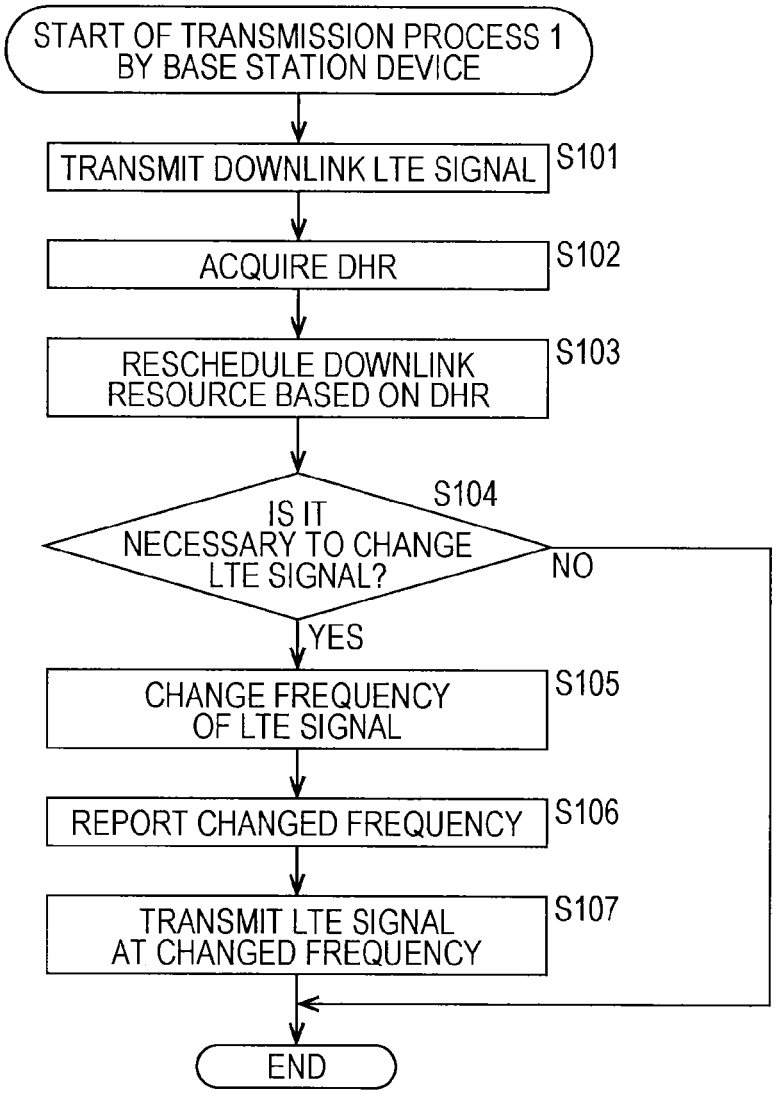
FIG. 14 is a flowchart for explaining a transmission process by the base station device.
Figure 15:
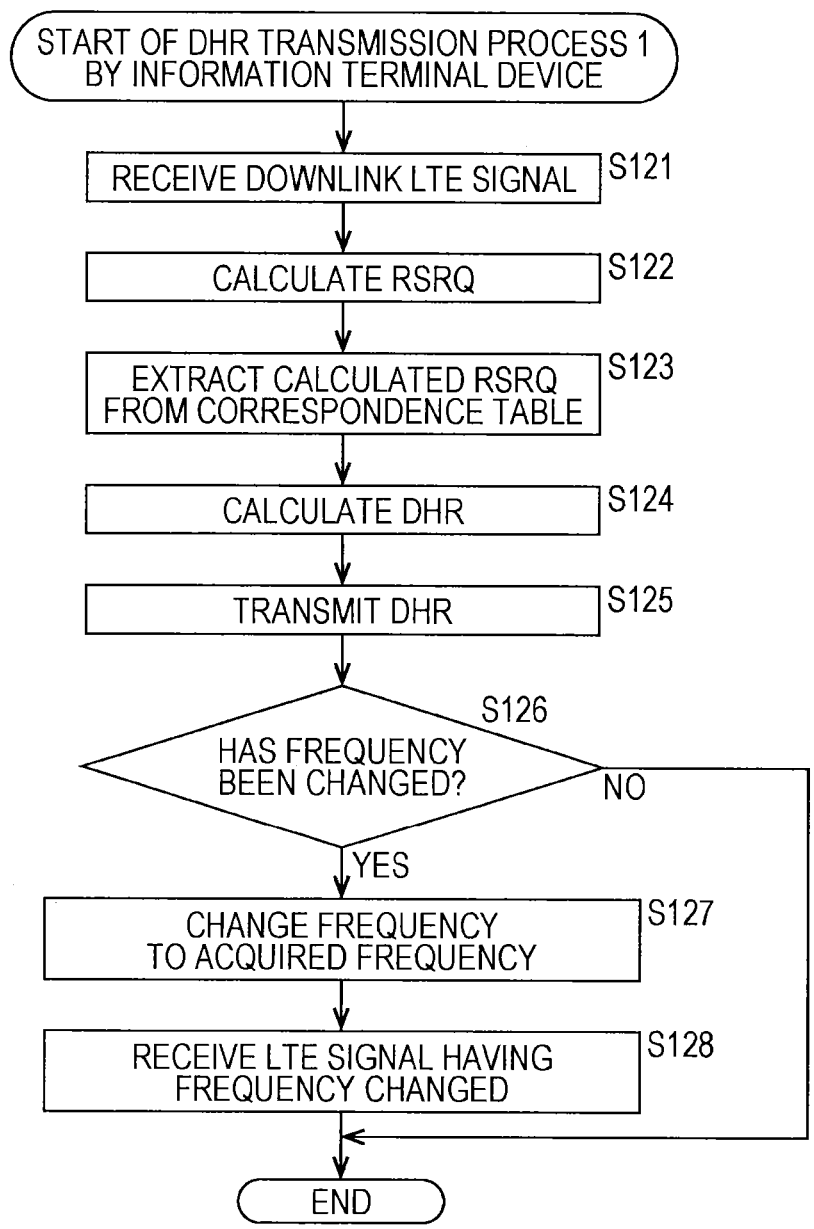
FIG. 15 is a flowchart for explaining a DHR transmission process by an information terminal device.

Referring to FIGS. 14 and 15, a DHR transmission process 1 is described.

FIG. 14 is a flowchart for explaining a transmission process 1 by the base station device 21. FIG. 15 is a flowchart for explaining the DHR transmission process 1 by an information terminal device 22.

The transmission process 1 shown in FIG. 14 and the DHR transmission process 1 shown in FIG. 15 are processes to be performed to avoid interference by changing the frequency of an LTE signal in a frequency division multiplexing (FDM) process or in a case where there is interference from the ISM band. The transmission process 1 is started when the base station device 21 transmits a predetermined signal to an information terminal device 22.

In step S101 in FIG. 14, the communication unit 541 of the base station device 21 transmits a downlink LTE signal to an information terminal device 22.

In step S121 in FIG. 15, the reception circuit unit 203 of the information terminal device 22 wirelessly receives the downlink LTE signal via the antenna 201 and the antenna duplexer 202. The downlink LTE signal might be disturbed by a WLAN signal or the like.

Figure 16:
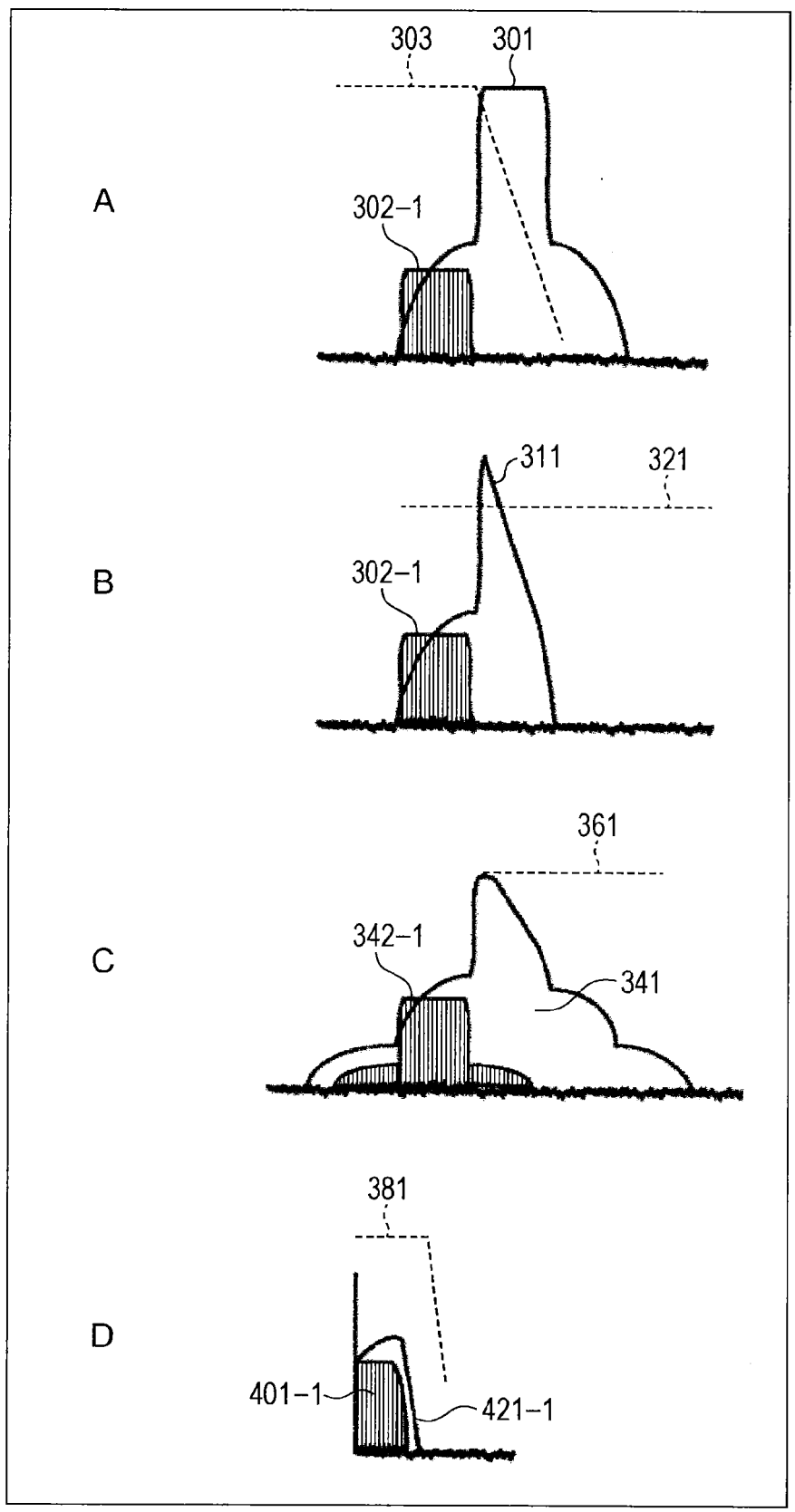
FIG. 16 is a diagram for explaining example cases where an LTE signal region is extracted from an interference signal.

Referring to FIG. 16, a process to receive an LTE signal from an interference signal that is received while being disturbed by a WLAN signal.

A of FIG. 16 shows an example of an interference signal. The interference signal is formed with a disturbance signal 301 and an LTE signal 302-1.

When the interference signal is supplied to the band selection filter unit 281 of the reception circuit unit 203, frequency components are extracted in accordance with the bandpass characteristics 303 of the band selection RF filter.

After specific frequencies are extracted by the band selection filter unit 281, the interference signal becomes as shown in B of FIG. 16. That is, the frequency components that do not match the bandpass characteristics 303 are removed. After the interference signal is amplified by the low noise amplifier 282, the state shown in B of FIG. 16 changes to the state shown in C of FIG. 16.

An allowable input level 321 is set in the low noise amplifier 282, and the portion of the interference signal (the disturbance signal 311 in B of FIG. 16, for example) that exceeds the allowable input level 321 is clipped off.

Accordingly, in a case where an interference signal is amplified by the low noise amplifier 282, the interference signal (the disturbance signal 341 in C of FIG. 16, for example) becomes equal to or lower than a saturation output level 361.

The mixer 283 then extracts a frequency region including an LTE signal 342-1 from the interference signal shown in C of FIG. 16, and the AGC circuit 284 adjusts the interference signal including the LTE signal 342-1 to a predetermined signal strength.

When the interference signal having the signal strength adjusted is supplied to the channel filter unit 285, the frequency components that do not match channel filter characteristics 381 are removed as shown in D of FIG. 16. As a result, an interference signal formed with an LTE signal 401-1 and the remaining disturbance signal 421-1 is output.

If an LTE signal region is extracted from a signal received in a state where any WLAN signal is not output or where there is no disturbance due to a WLAN signal, on the other hand, the disturbance signal 301 shown in A of FIG. 16 does not exist, and therefore, only the LTE signal 401-1 shown in D of FIG. 16 is extracted.

Referring back to FIG. 15, in step S122, the reception data control unit 221 of the information terminal device 22 calculates RSRQ. Specifically, the level of the signal extracted from a signal that is received while being disturbed by a WLAN signal is set as the denominator RSSI in the equation (1).

On the other hand, the numerator RSRP in the equation (1) can be easily determined from the signal level of the LTE signal input from the signal generation device 241 via the antenna 201.

N in the equation (1) may be reported as system information or a desired value may be designated as N by the base station device 21. Alternatively, an appropriate value may be generated as N in the information terminal device 22.

In step S123, the desense headroom calculation unit 223 extracts the RSRQ calculated through the processing in step S124 from a correspondence table stored in the memory 207.

Specifically, the desense headroom calculation unit 223 senses the frequency $f_1$ of the LTE signal being currently received from the output of the channel frequency control unit 222. Also, the level of a signal extracted from a signal that is received while not being disturbed by a WLAN signal corresponds to the signal strength $P_1$.

In view of this, the correspondence table containing values from which the signal strength $P_1$ is detected at the sensed frequency $f_1$ is selected, and the RSRQ values in the correspondense table are searched for the value corresponding to the calculated RSRQ, to extract the signal strength $P_3$ corresponding to the detected RSRQ.

In step S124, the desense headroom calculation unit 223 calculates a DHR. Specifically, a difference between the maximum signal strength $P_3max$ corresponding to the frequency $f_1$ and the signal strength $P_1$, and the extracted signal strength $P_3$ is calculated as the DHR.

The maximum signal strength $P_3max$ is the value of the signal strength $P_3$ in a case where the RSRQ increases by a predetermined amount or more when the value of the signal strength $P_3$ is increased. Specifically, when the signal strength $P_3$ is increased in comparison with the value of a signal strength $P_1$, for example, the value of the RSRQ also changes in accordance with the increase in normal circumstances.

When the level of the signal strength $P_3$ becomes too high, however, the reception circuit unit 203 reaches saturation, and degradation of the RSRQ is larger than a value estimated from the increase in the signal strength $P_3$.

In view of this, when additional degradation of the RSRQ due to the saturation reaches 3 dB, for example, the reception circuit unit 203 is determined to be saturated. Specifically, the maximum signal strength $P_{3max}$ represents the limit of the signal strength $P_3$ with which LTE communications are possible without disturbance.

The degradation level of the RSRQ that causes saturation is not limited to 3 dB, and is appropriately set. The setting of the saturation level may be designated from the base station device 21.

For example, when the value of the signal strength $P_3$ in a case where the RSRQ increases 3 dB or more is the maximum signal strength $P_{3max}$, −2 as the signal strength $P_3$ with which the RSRQ is degraded by 3 dB, from −8 to −11, is acquired as the maximum signal strength $P_{3max}$ from the correspondence table 441-1-1 shown in FIG. 11.

Alternatively, the maximum signal strength $P_{3max}$ or the DHR calculated by using the maximum signal strength $P_{3max}$ may be stored, together with the RSRQ, into a correspondence table in advance, so that the maximum signal strength $P_{3max}$ or the DHR stored in the correspondence table can be acquired later.

In step S125, the transmission data processing unit 224 transmits the DHR to the base station device 21 via the D/A converter 208, the transmission circuit unit 210, the antenna duplexer 202, and the antenna 201.

In step S102 in FIG. 14, the communication unit 541 of the base station device 21 acquires the DHR. That is, the DHR transmitted through the processing in step S125 in FIG. 15 is acquired.

In step S103, the LTE signal control unit 542 reschedules downlink resources based on the DHR. For example, resources for terminal devices including the information terminal device 22 communicating with the base station 21 are appropriately distributed, and all the resources to be used in communications between the base station 21 and terminal devices are optimized.

In step S104, the LTE signal control unit 542 determines whether there is a need to change the LTE signal. In a case where the DHR is less than a threshold value, for example, it is determined that there is a need to change the LTE signal.

If it is determined in step S104 that there is a need to change the LTE signal, or in a case where the DHR is less than the threshold value and the LTE signal to be transmitted to the information terminal device 22 is interfered with to such a degree that the interference should be avoided, the LTE signal control unit 542 in step S105 changes the frequency of the LTE signal so that the difference from the frequency of the disturbance signal becomes larger.

In step S106, the communication unit 541 notifies the information terminal device 22 of the changed frequency.

In step S126 in FIG. 15, the reception data processing unit 221 of the information terminal device 22 determines whether the frequency acquired from the base station device 21 via the antenna 201, the antenna duplexer 202, the reception circuit unit 203, and the A/D converter 205 has been changed.

If it is determined in step S126 that the frequency acquired from the base station device 21 has been changed, the reception data processing unit 221 in step S127 changes the frequency at which the LTE signal is to be received, to the acquired frequency.

Referring back to FIG. 14, in step S107, the communication unit 541 of the base station device 21 transmits the LTE signal that has been generated by the LTE signal generation unit 543 and has the changed frequency, to the information terminal device 22. Accordingly, LTE signal interference with the information terminal device 22 can be avoided.

After the processing in step S107, when it is determined in step S104 that there is no need to change the LTE signal (when the DHR is equal to or larger than the threshold value, for example), and the processing in steps S105 through S107 is skipped, the transmission process 1 comes to an end.

In step S128 in FIG. 15, the reception data processing unit 221 of the information terminal device 22 receives the LTE signal at the changed frequency from the base station device 21 via the antenna 201, the antenna duplexer 202, the reception circuit unit 203, and the A/D converter 205.

After the processing in step S128, when it is determined in step S126 that a frequency to be changed has not been acquired, and the processing in steps S127 and S128 is skipped, the DHR transmission process 1 comes to an end.

The base station device 21 requests an information terminal device 22 to transmit a DHR at regular time intervals, for example. In that case, the intervals are wide (or measurement is carried out infrequently) when the margin before the threshold value is wide, and the intervals are made narrower (or measurement is carried out frequently) when the margin becomes narrower.

Figure 17:
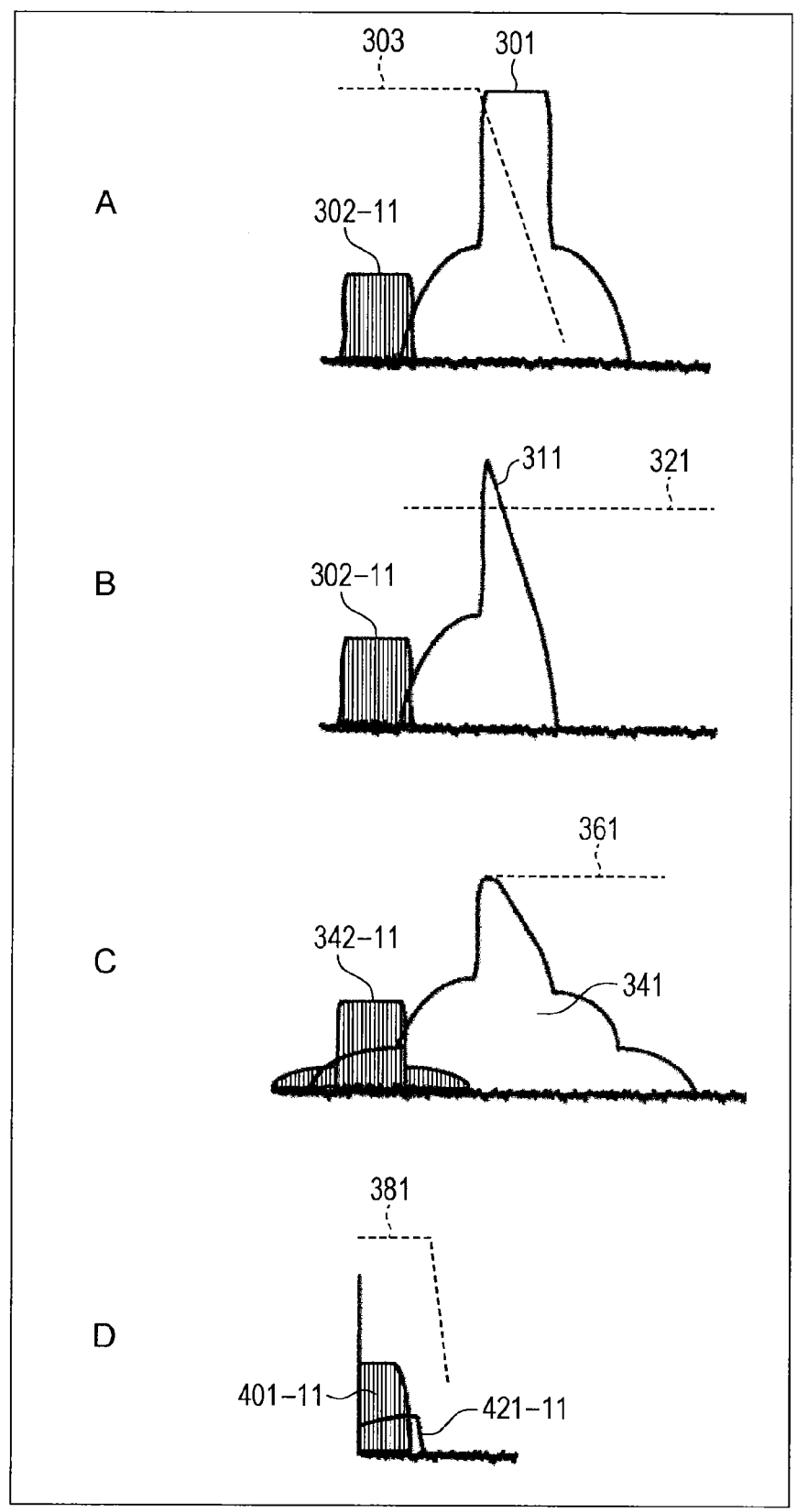
FIG. 17 is a diagram for explaining example cases where an LTE signal region is extracted from an interference signal.

Referring to FIG. 17, cases where the frequency of an LTE signal is changed are described.

FIG. 17 shows examples of interference signals in cases where the frequency of an LTE signal is changed. As shown in A of FIG. 17, the position of an LTE signal 302-11 is further away from the disturbance signal 301 than the LTE signal 302-1 shown in A of FIG. 16.

After specific frequencies are extracted by the band selection filter unit 281, the interference signal in A of FIG. 17 becomes as shown in B of FIG. 17. After the interference signal is amplified by the low noise amplifier 282, the state shown in B of FIG. 17 changes to the state shown in C of FIG. 17.

The mixer 283 then extracts a frequency region including an LTE signal 342-11 from the interference signal shown in C of FIG. 17, and the AGC circuit 284 adjusts the interference signal including the LTE signal 342-11 to a predetermined signal strength.

When the interference signal having the signal strength adjusted is supplied to the channel filter unit 285, an interference signal formed with an LTE signal 401-11 and a disturbance signal 421-11 is output based on the channel filter characteristics 381, as shown in D of FIG. 17.

As is apparent from the comparison between D of FIG. 17 and D of FIG. 16, the influence of the disturbance signal 421-11 on the LTE signal 401-11 in D of FIG. 17 is smaller than the influence of the disturbance signal 421-1 on the LTE signal 401-1 in D of FIG. 16.

[DHR Transmission Process 2]

Figure 18:
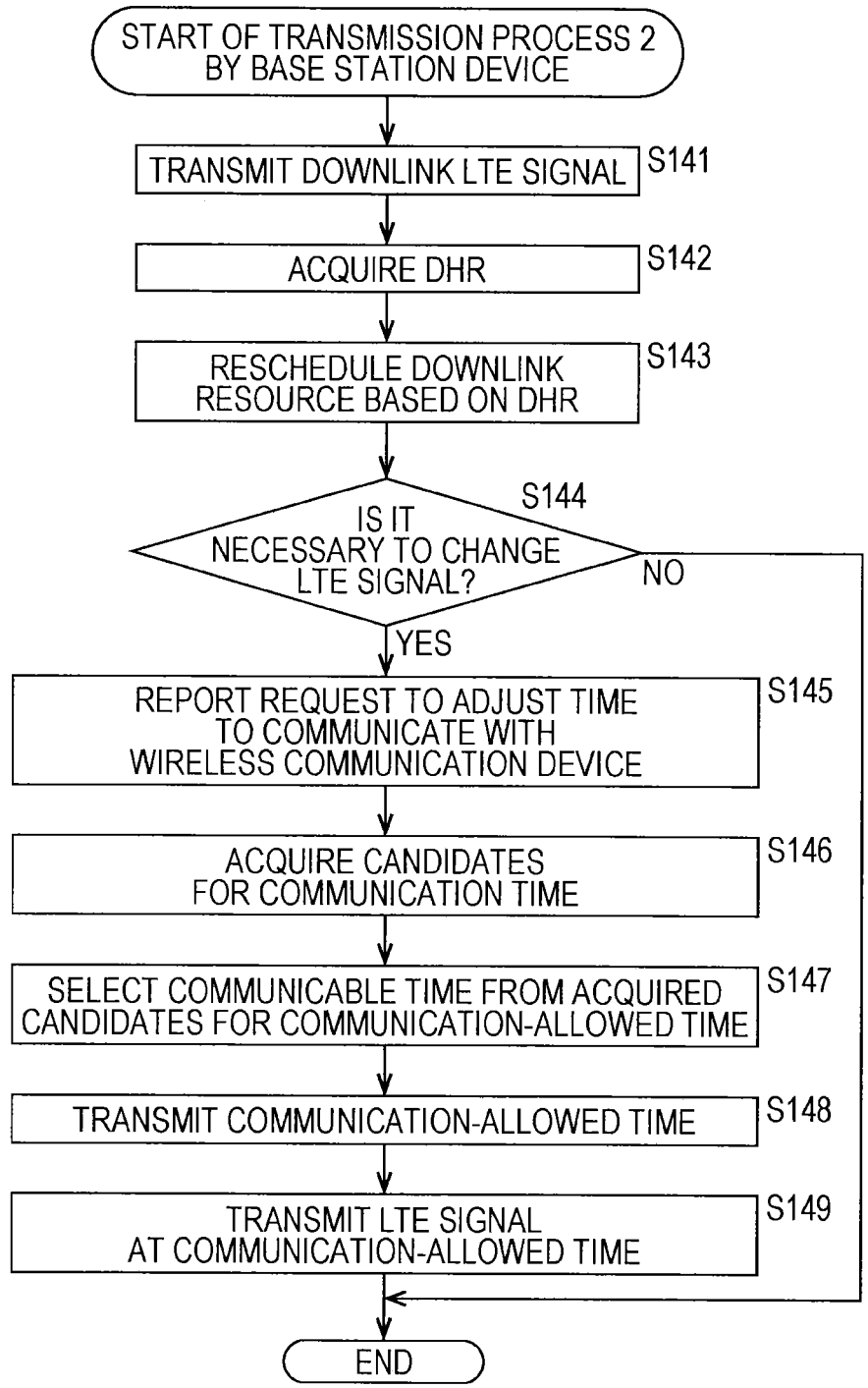
FIG. 18 is a flowchart for explaining a transmission process by the base station device.
Figure 19:
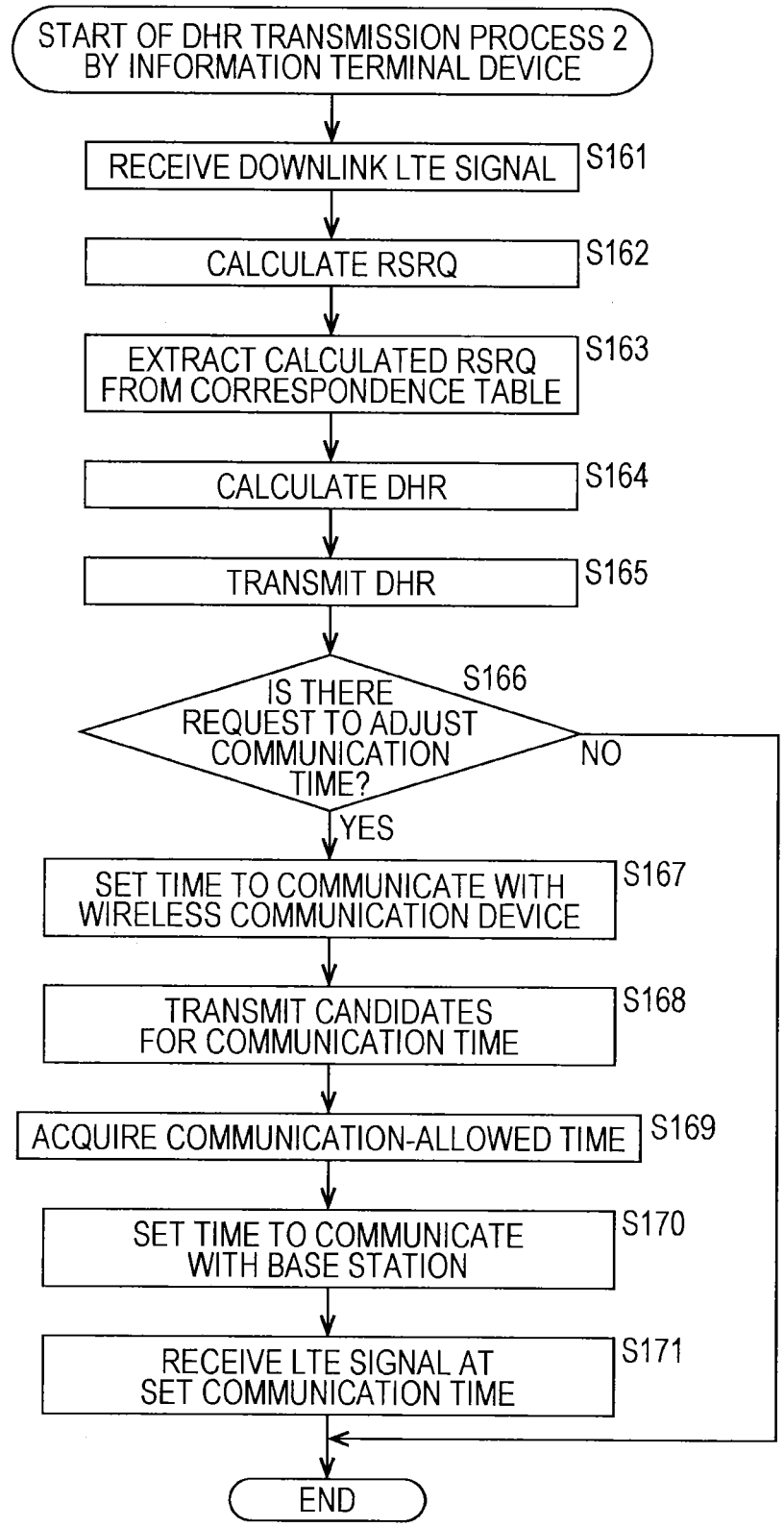
FIG. 19 is a flowchart for explaining a DHR transmission process by the information terminal device.

Referring now to FIGS. 18 and 19, a DHR transmission process 2 is described.

FIG. 18 is a flowchart for explaining a transmission process 2 by the base station device 21. FIG. 19 is a flowchart for explaining the DHR transmission process 2 by an information terminal device 22.

In FIG. 18, the processing in steps S141 through S144 is equivalent to the processing in steps S101 through S104 in FIG. 14. Also, in FIG. 19, the processing in steps S161 through S165 is equivalent to the processing in steps S121 through S125 in FIG. 15. Therefore, detailed explanation of the processing will not be repeated, and the processing will be only briefly described.

The transmission process 2 shown in FIG. 18 and the DHR transmission process 2 shown in FIG. 19 are processes to be performed to avoid mutual interference between an LTE signal and an ISM signal in a time division duplexing (TDD) process. The transmission process 2 is started when the base station device 21 transmits a predetermined signal to an information terminal device 22.

In step S141, the communication unit 541 of the base station device 21 transmits a downlink LTE signal to an information terminal device 22.

In step S161, the reception circuit unit 203 receives the downlink LTE signal via the antenna 201 and the antenna duplexer 202.

In step S162, the reception data control unit 221 calculates RSRQ. Specifically, the level of a signal extracted from a signal that is received while being disturbed by a WLAN signal is set as the denominator RSSI in the equation (1), and the numerator RSRP in the equation (1) is calculated from the signal level of the LTE signal input from the base station device 21.

In step S163, the desense headroom calculation unit 223 extracts the RSRQ calculated through the processing in step S162 from a correspondence table stored in the memory 207.

Specifically, the correspondence table containing values from which the signal strength $P_1$ is detected at the sensed frequency $f_1$ is selected, and the RSRQ values in the correspondence table are searched for the value corresponding to the calculated RSRQ, to extract the signal strength $P_3$ corresponding to the detected RSRQ.

In step S164, the desense headroom calculation unit 223 calculates a DHR. Specifically, a difference between the maximum signal strength $P_3$max corresponding to the frequency $f_1$ and the signal strength $P_1$, and the extracted signal strength $P_3$ is calculated as the DHR.

In step S165, the transmission data processing unit 224 transmits the DHR to the base station device 21 via the D/A converter 208, the transmission circuit unit 210, the antenna duplexer 202, and the antenna 201.

In step S142 in FIG. 18, the communication unit 541 of the base station device 21 acquires the DHR. That is, the DHR transmitted through the processing in step S165 in FIG. 19 is acquired.

In step S143, the LTE signal control unit 542 reschedules downlink resources based on the DHR.

In step S144, the LTE signal control unit 542 determines whether there is a need to change the LTE signal. In a case where the DHR is less than a threshold value, for example, it is determined that there is a need to change the LTE signal.

If it is determined in step S144 that there is a need to change the LTE signal, or in a case where the DHR is less than the threshold value and the LTE signal to be transmitted to the information terminal device 22 is interfered with to such a degree that the interference should be avoided, the LTE signal control unit 542 in step S145 notifies the information terminal device 22 of a request to adjust the time to communicate with a wireless communication device.

In step S166 in FIG. 19, the reception data processing unit 221 of the information terminal device 22 determines whether the request to adjust the communication time has been acquired from the base station device 21 via the antenna 201, the antenna duplexer 202, the reception circuit unit 203, and the A/D converter 205.

If it is determined in step S166 that the request to adjust the communication time has been acquired from the base station device 21, the reception data processing unit 221 in step S167 sets a time to communicate with a wireless communication device.

In step S168, the transmission data processing unit 224 transmits candidate communication times to the base station device 21 via the D/A converter 208, the transmission circuit unit 210, the antenna duplexer 202, and the antenna 201.

Specifically, the reception data processing unit 221 transmits candidate LTE signal communication times that do not overlap the time to transmit a WLAN signal as set in step S169.

In step S146 in FIG. 18, the communication unit 541 of the base station device 21 acquires the candidate communication times. That is, the candidate communication times transmitted through the processing in step S168 in FIG. 19 are acquired.

In step S147, the LTE signal control unit 542 selects a communication-allowed time from the candidate communication times acquired through the processing in step S145.

In step S148, the communication unit 541 transmits the communication-allowed time to the information terminal device 22. That is, the communication time selected in step S147 is transmitted to the information terminal device 22.

In step S169 in FIG. 19, the reception data processing unit 221 of the information terminal device 22 acquires the communication-allowed time from the base station device 21 via the antenna 201, the antenna duplexer 202, the reception circuit unit 203, and the A/D converter 205.

In step S170, the reception data processing unit 221 sets the time to communicate with the base station device 21. That is, the communication time set through the processing in step S169 is set.

Referring back to FIG. 18, in step S149, the communication unit 541 of the base station device 21 transmits an LTE signal to the information terminal device 22 at the communication-allowed time. Accordingly, LTE signal interference with the information terminal device 22 can be avoided.

After the processing in step S149, when it is determined in step S144 that there is no need to change the LTE signal (when the DHR is equal to or larger than the threshold value, for example), and the processing in steps S145 through S149 is skipped, the DHR transmission process 2 comes to an end.

In step S171 in FIG. 19, the reception data processing unit 221 of the information terminal device 22 receives the LTE signal at the communication time set by the base station device 21, via the antenna 201, the antenna duplexer 202, the reception circuit unit 203, and the A/D converter 205. Thereafter, a communication with the base station device 21 is performed at the set time.

After the processing in step S171, if it is determined in step S166 that the request to adjust the communication time has not been received, and the processing in steps S167 through S171 is skipped, the DHR transmission process 2 comes to an end.

Normally, management of characteristics variations among the RF filters of the band selection filter units 281 of information terminal devices 22 is difficult, and the characteristics of the RF filters are greatly affected by changes in the characteristics of the connected antenna 201 and changes in grounding conditions, and impedance matching conditions, and the like.

Also, in the low noise amplifier 282 of an information terminal device 22, the linearity of the circuit tends to depend on variations in transistor devices, variations in the current flowing in transistor devices, variations in source voltage, and temperature, and the allowable input level 321 tends to vary among the information terminal devices 22.

Further, as described above with reference to FIGS. 16 and 17, in a case where the frequency $f_1$ of an LTE signal is relatively closer to the frequency $f_2$ of a disturbance signal, the influence of the third-order distortions 61 is large. In a case where the frequency $f_1$ of an LTE signal is relatively far from the frequency $f_2$ of a disturbance signal, the influence of the fifth-order distortions 62 is large.

As described above, due to various causes of variations and differences in the influence of distortions depending on channel positions, RSRQs calculated by the reception data processing unit 221 of an information terminal device 22 do not have one-to-one correspondence with signal strengths of interference signals that are input via the reception system of the information terminal device 22.

In the present technique, interference states are managed not by RSRQs but by DHRs as the information indicating the margin in which disturbance as an interfering state that varies among the information terminal devices 22 is not caused. Accordingly, interference between an LTE signal and a disturbance signal can be certainly avoided.

Also, as the information to be transmitted to the base station device 21 is only DHRs, information with a high degree of granularity can be transmitted with a smaller number of bits.

[Structure of a Personal Computer]

FIG. 20 is a block diagram showing an example structure of the hardware of a personal computer that performs the above described series of processes in accordance with a program.

In the personal computer 601, a CPU (Central Processing Unit) 621, a ROM (Read Only Memory) 622, and a RAM (Random Access Memory) 623 are connected to one another by a bus 624.

An input/output interface 5 is further connected to the bus 624. An input unit 626, an output unit 627, a storage unit 628, a communication unit 629, and a drive 630 are connected to the input/output interface 625.

The input unit 626 is formed with a keyboard, a mouse, a microphone, or the like. The output unit 627 is formed with a display, a speaker, or the like. The storage unit 628 is formed with a hard disk, a nonvolatile memory, or the like.

The communication unit 629 is formed with a network interface or the like. The drive 630 drives a removable medium 631 such as a magnetic disk, an optical disk, a magnetooptical disk, or a semiconductor memory.

In the personal computer 601 having the above described structure, the CPU 621 loads a program stored in the storage unit 628 into the RAM 623 via the input/output interface 625 and the bus 624, and executes the program, so that various kinds of processes are performed.

The program to be executed by the CPU 621 is recorded on the removable medium 631 as a packaged medium or the like, and is then provided.

The packaged medium may be a magnetic disk (including a flexible disk), an optical disk (such a CD-ROM (Compact Disc-Read Only Memory) or a DVD (Digital Versatile Disc)), a magnetooptical disk, a semiconductor memory, or the like.

Alternatively, the program can be provided via a wired or wireless transmission medium such as a local area network, the Internet, or digital satellite broadcasting.

In the personal computer 601, the program can be installed into the storage unit 628 via the input/output interface 625 by mounting the removable medium 631 on the drive 630.

The program can also be received by the communication unit 629 via a wired or wireless transmission medium, and be installed into the storage unit 628. Other than that, the program can be installed beforehand into the ROM 622 or the storage unit 628.

The program to be executed by the personal computer 601 may be a program for carrying out processes in chronological order in accordance with the sequence described in this specification, or a program for carrying out processes in parallel or whenever necessary such as when there is a call.

[Others]

In this specification, the term "system" means an entire apparatus that is formed with devices and means.

It should be noted that embodiments of the present technique are not limited to the above described embodiments, and various changes may be made to them without departing from the scope of the present technique. Also, in an embodiment of the present technique, another apparatus may have one function of the embodiment.

The present technique can also be in the following forms.

(1) A communication terminal device including: a first communication unit that performs a first communication with a first other device; and a second communication unit that performs a second communication with a second other device, the first communication unit transmitting information to the first other device, the information indicating the margin in which the first communication is not disturbed by the second communication.

(2) The communication terminal device of (1), further including a desense headroom calculation unit that calculates a desense headroom as the information indicating the margin, the desense headroom calculation unit calculating the desense headroom based on a difference between a parameter that indicates a degree of disturbance of the first communication by the second communication and is stored in advance, and the parameter calculated at a predetermined time.

(3) The communication terminal device of (2), wherein the desense headroom calculation unit sets a maximum signal strength that is the signal strength of a mixed signal of a signal in the first communication and a signal in the second communication when a change in the parameter becomes equal to or larger than a predetermined value as a result of an increase in the signal strength of the mixed signal, and calculates the desense headroom that is a difference between the maximum signal strength and the signal strength of the mixed signal that has been input.

(4) The communication terminal device of (3), wherein, when the desense headroom calculated by the desense headroom calculation unit is smaller than a threshold value, the frequency of the first communication by the first communication unit is changed to a frequency further away from the frequency of the second communication by the second communication unit.

(5) The communication terminal device of (3), wherein, when the desense headroom calculated by the desense headroom calculation unit is smaller than a threshold value, the timing of the first communication by the first communication unit is changed so as not to overlap the second communication.

(6) The communication terminal device of any of (2) through (5), wherein the parameter is stored and associated with the frequency and the signal strength of the signal in the first communication, and the signal strength of the mixed signal of the signal in the first communication and the signal in the second communication.

(7) The communication terminal device of any of (2) through (6), wherein the parameter is calculated at regular time intervals, and the intervals are made narrower when a difference between the calculated desense headroom and the threshold value becomes smaller than a predetermined value.

(8) The communication terminal device of any of (2) through (7), wherein the parameter is RSRQ.

(9) A communication method including: performing a first communication with a first other device; performing a second communication with a second other device; and transmitting information to the first other device, the information indicating a margin in which the first communication is not disturbed by the second communication.

(10) A base station device including: a communication unit that performs a first communication with a communication terminal device and receives, from the communication terminal device, information indicating the margin in which the first communication is not disturbed by a second communication with another device; and a control unit that controls the first communication to avoid interference with the first communication with the communication terminal device based on the margin-indicating information received by the communication unit.

(11) A communication system that is formed with a communication terminal device and a base station device, the communication terminal device including a first communication unit that transmits information to the communication terminal device, the information indicating the margin in which a first communication with the base station device is not disturbed by a second communication with another device, the base station device including: a second communication unit that performs the first communication with the communication terminal device and receives the information indicating the margin from the communication terminal device; and a control unit that controls the first communication to avoid interference with the first communication with the communication terminal device based on the margin-indicating information received by the second communication unit.

REFERENCE SIGNS LIST

21 Base station device, 22 Information terminal device, 203 Reception circuit unit, 207 Memory, 221 Reception data processing unit, 223 Desense headroom calculation unit, 224 Transmission data processing unit, 241 Signal generation device, 541 Communication unit, 542 LTE signal control unit

The invention claimed is:

1. A communication terminal device comprising:
a first communication unit configured to perform a first communication with a first other device;
a second communication unit configured to perform a second communication with a second other device,
the first communication unit transmitting information to the first other device, the information indicating a margin in which the first communication is not disturbed by the second communication; and
a desense headroom calculation unit configured to calculate a desense headroom as the information indicating the margin,
wherein the desense headroom calculation unit is configured to calculate the desense headroom based on a difference between a value of a parameter that is stored in advance, and a value of the parameter calculated at a predetermined time, wherein the parameter indicates a degree of disturbance of the first communication by the second communication.

2. The communication terminal device according to claim 1, wherein the desense headroom calculation unit sets a maximum signal strength that is a signal strength of a mixed signal of a signal in the first communication and a signal in the second communication when a change in the parameter becomes equal to or larger than a predetermined value as a result of an increase in the signal strength of the mixed signal, and calculates the desense headroom that is a difference between the maximum signal strength of the mixed signal and the signal strength of the mixed signal that has been input.

3. The communication terminal device according to claim 1, wherein, when the desense headroom calculated by the desense headroom calculation unit is smaller than a threshold value, a frequency of the first communication by the first communication unit is changed to a frequency further away from a frequency of the second communication by the second communication unit.

4. The communication terminal device according to claim 1, wherein the value of the parameter is stored and associated with a frequency and a signal strength of a signal in the first communication, and a signal strength of a mixed signal of the signal in the first communication and a signal in the second communication.

5. The communication terminal device according to claim 3, wherein the value of the parameter is calculated at regular time intervals, and the intervals are made narrower when a difference between the calculated desense headroom and the threshold value becomes smaller than a predetermined value.

6. The communication terminal device according to claim 1, wherein, when the desense headroom calculated by the desense headroom calculation unit is smaller than a threshold value, timing of the first communication by the first communication unit is changed so as not to overlap the second communication.

7. The communication terminal device according to claim 1, wherein the parameter is Reference Signal Received Quantity (RSRQ).

8. A communication method comprising:
performing a first communication with a first other device;
performing a second communication with a second other device; and
transmitting information to the first other device, the information indicating a margin in which the first communication is not disturbed by the second communication,
wherein the information indicating the margin is determined based on a difference between a value of a parameter that is stored in advance, and a value of the parameter calculated at a predetermined time, wherein the parameter indicates a degree of disturbance of the first communication by the second communication.

9. A base station device comprising:
a communication unit configured to perform a first communication with a communication terminal device and receives, from the communication terminal device, information indicating a margin in which the first communication is not disturbed by a second communication with another device; and
a control unit configured to control the first communication to avoid interference with the first communication with the communication terminal device based on the information indicating the margin received by the communication unit,
wherein the information indicating the margin is determined based on a difference between a value of a parameter that is stored in advance, and a value of the parameter calculated at a predetermined time, wherein the parameter indicates a degree of disturbance of the first communication by the second communication.

10. A communication system comprising a communication terminal device and a base station device,
the communication terminal device including:
a first communication unit configured to transmit information to the communication terminal device, the information indicating a margin in which a first communication with the base station device is not disturbed by a second communication with another device,
the base station device including:
a second communication unit configured to perform the first communication with the communication terminal device and receives the information indicating the margin from the communication terminal device; and
a control unit configured to control the first communication to avoid interference with the first communication with the communication terminal device based on the information indicating the margin received by the second communication unit,
wherein the information indicating the margin is determined based on a difference between a value of a parameter that is stored in advance, and a value of the parameter calculated at a predetermined time, wherein the parameter indicates a degree of disturbance of the first communication by the second communication.

* * * * *